United States Patent [19]
Yokose et al.

[11] Patent Number: 6,072,909
[45] Date of Patent: *Jun. 6, 2000

[54] IMAGE CODING DEVISE AND IMAGE DECODING DEVISE USING WITH IMAGE DISASSEMBLY

[75] Inventors: Taro Yokose; Shunichi Kimura; Yutaka Koshi, all of Nakai-machi, Japan

[73] Assignee: Fuji Xerox Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/730,764

[22] Filed: Oct. 15, 1996

[30] Foreign Application Priority Data

Dec. 13, 1995 [JP] Japan .................................... 7-324659

[51] Int. Cl.⁷ .............................. G06K 9/36; G06K 9/46
[52] U.S. Cl. ......................... 382/247; 341/107; 382/234
[58] Field of Search .................................... 382/233, 238, 382/239, 234, 247, 244, 245, 246; 358/433, 430, 261.2; 341/51, 107; 348/394, 410, 411, 421

[56] References Cited

U.S. PATENT DOCUMENTS

| | | | |
|---|---|---|---|
| 4,745,473 | 5/1988 | Hall ........................................ | 348/396 |
| 5,086,488 | 2/1992 | Kato et al. ............................... | 382/239 |
| 5,291,282 | 3/1994 | Nakagawa et al. ..................... | 348/384 |
| 5,414,527 | 5/1995 | Koshi et al. ............................. | 358/433 |
| 5,432,769 | 7/1995 | Honjo ...................................... | 369/60 |
| 5,442,458 | 8/1995 | Rabbani et al. ......................... | 358/426 |
| 5,543,843 | 8/1996 | Kato et al. ............................... | 348/400 |
| 5,577,132 | 11/1996 | Yokose et al. .......................... | 382/247 |
| 5,659,631 | 8/1997 | Gormish et al. ........................ | 382/233 |
| 5,689,589 | 11/1997 | Gormish et al. ........................ | 382/239 |

OTHER PUBLICATIONS

Rabbani et al., Conditioning contexts for the arithmetic coding of bit planes, Jan. 1992, pp. 232–236.

*Primary Examiner*—Amelia Au
*Assistant Examiner*—Timothy M. Johnson
*Attorney, Agent, or Firm*—Oliff & Berridge, PLC

[57] ABSTRACT

Disclosed herein are easy-to-realize multivalued image coding and decoding devices, each of which is capable of reducing memories in number while the accuracy of calculations necessary upon coding and decoding is being held and relaxing a probability estimate. An image disassembler disassembles a bit string indicative of pixels into a plurality of parts in response to image data inputted from an image input unit. Further, the image disassembler sends the value of each disassembled pixel to be coded and the value of each disassembled pixel for reference to an image analyzer as disassembled image data. The image analyzer sends the value of each disassembled pixel to be coded to a coding unit as disassembled pixel-value data and transmits the value of the reference pixel to a probability estimate unit as status data. The probability estimate unit sends probability estimate data corresponding to the status data to the coding unit. The coding unit creates a codeword for each disassembled part from the probability estimate data and the disassembled pixel-value data and sends it to a code output unit as coded data.

20 Claims, 18 Drawing Sheets

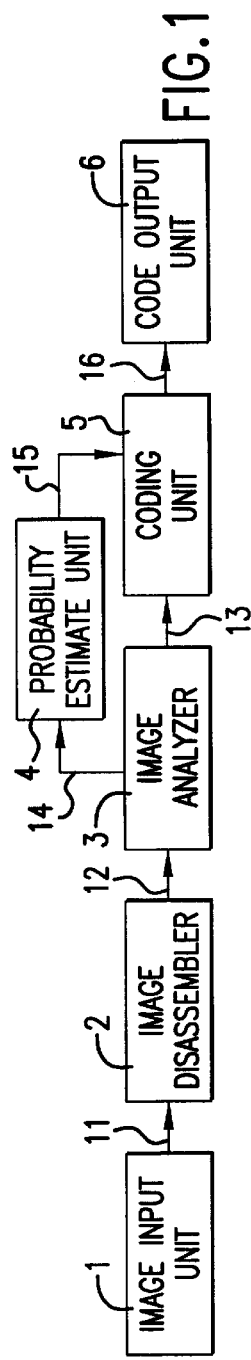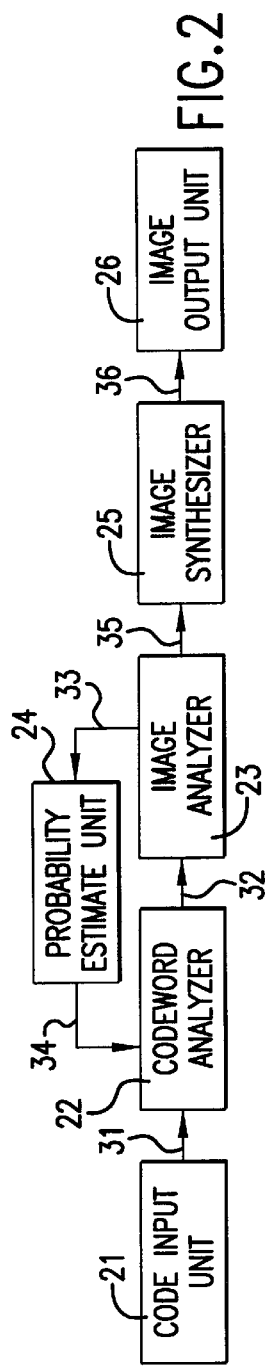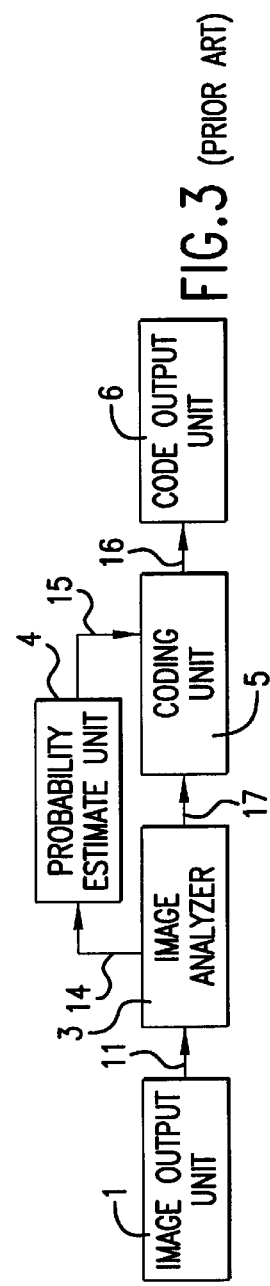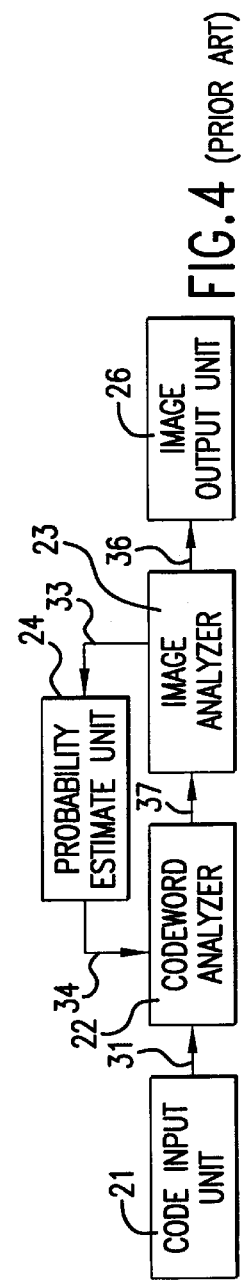

|  | BINARY ARITHMETIC CODES | | MULTIVALUE (8 BIT) ARITHMETIC CODES |
|---|---|---|---|
| NUMBER OF REFERENCE PIXELS | 0 | 10 | JBIG | 0 | 2 |
| NUMBER OF STATES | 2 | 1,024 | 4,096 | 256 | ABOUT 17 MILLION |

FIG. 7 (PRIOR ART)

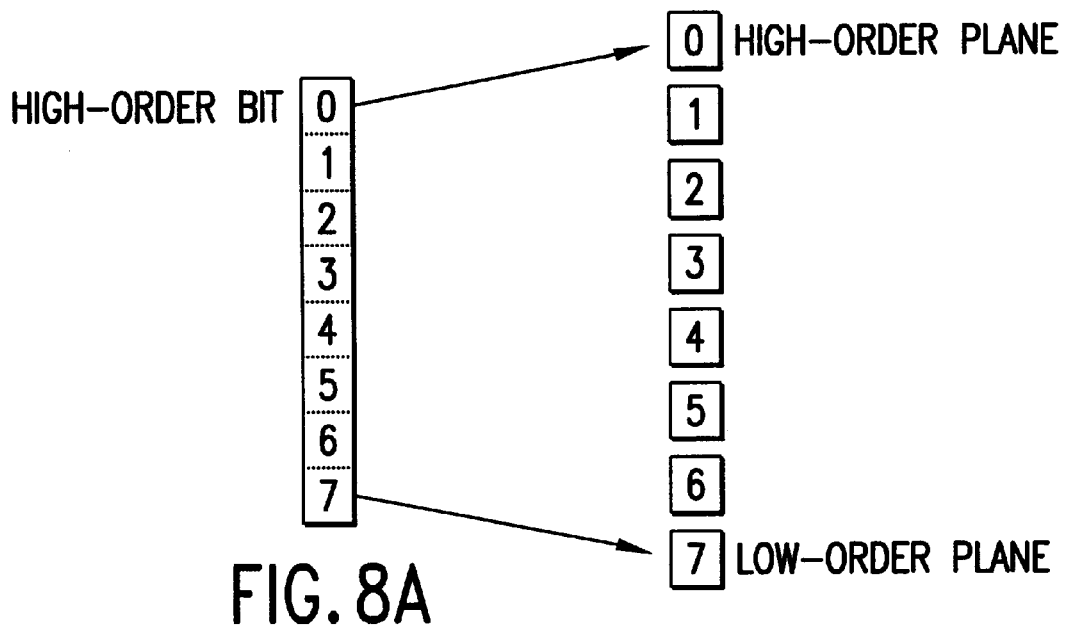
FIG. 8A
FIG. 8B
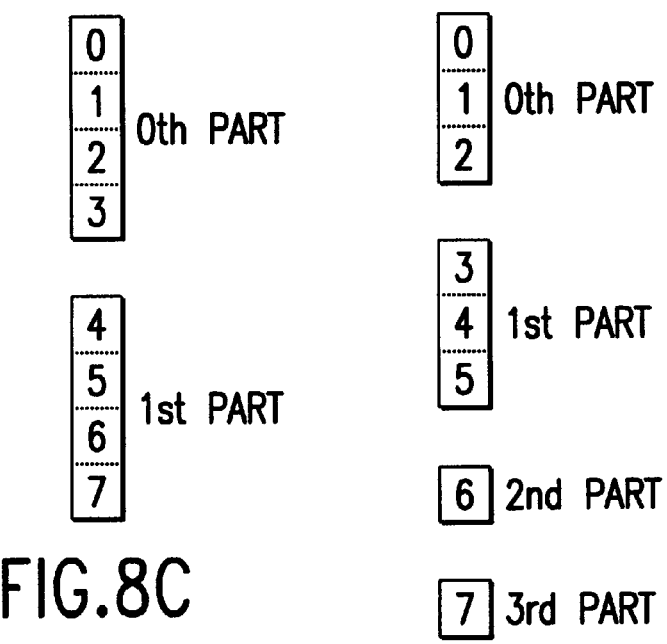
FIG. 8C
FIG. 8D

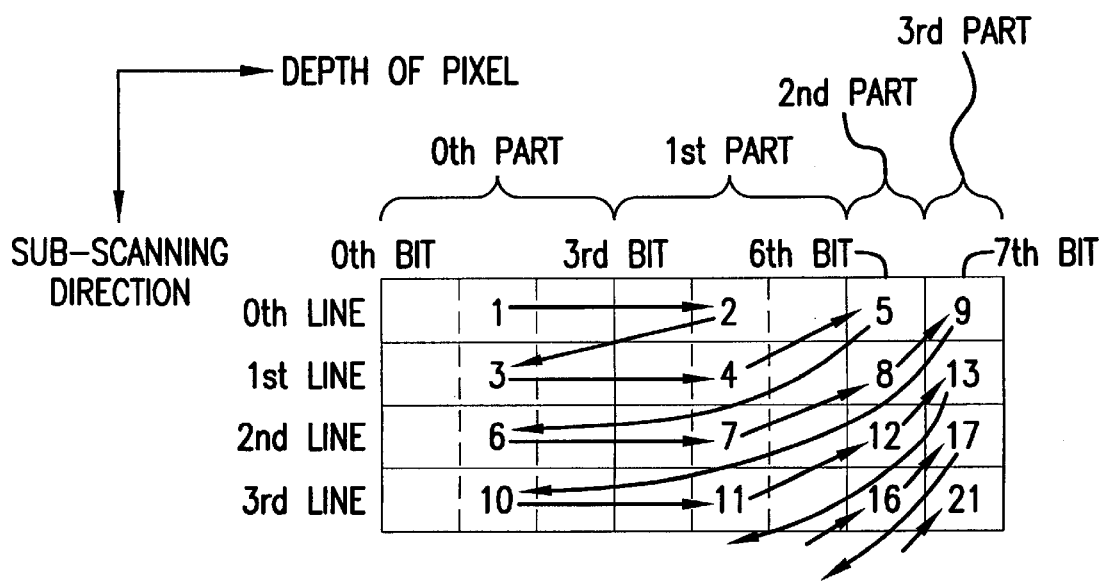

|  | REFERENCE OBJECT | | |
|---|---|---|---|
|  | (j−1)th LINE | j−th LINE | (j+1)th LINE |
| 0th PART | 0th PART | − | − |
| 1st PART | 1st PART | 0th PART | − |
| 2nd PART | 1st AND 2nd PARTS | 1st PART | 1st PART |
| 3rd PART | 1st TO 3rd PARTS | 1st AND 2nd PARTS | 2nd PART |

FIG. 15

IMAGE CODING DEVISE AND IMAGE DECODING DEVISE USING WITH IMAGE DISASSEMBLY

BACKGROUND OF THE INVENTION

1. Field of the Invention

The present invention relates to an image coding device and an image decoding device, and particularly to lossless coding/decoding and lossy coding/decoding effected on an input image expressed in multivalues.

2. Description of the Related Art

Arithmetic coding is a kind of entropy coding and shows a high-efficiency coding method wherein a coding ratio (hereinafter abbreviated as "C/R") is brought closer to entropy under the process of steady probability as input data increases. As an example using the arithmetic coding in practice, JBIG (Joint Bi-level Image Group) is known which is the international standard of binary lossless coding. In the JBIG, an improvement in C/R has been made by adding state division using pixels for reference to the arithmetic coding. At this time, a combination of values of one or plural reference pixels will be called "context" below. Further, a combination of the context and the value of the pixel to be coded will be called "state" below.

In general, the arithmetic coding is often used as a coding method for handling binary data. However, there is now a growing demand for coding of a multivalued image with the advancement of image processing technology. Correspondingly, it has inevitably been desired that the arithmetic coding is also applied to the multivalued image.

When a multivalued image is compressed by the normal arithmetic coding, a process of converting it from multivalue data to binary data is required as a preprocess. This has been described in, for example, a reference entitled "International Standard for Multimedia Coding" edited by Hiroshi Yasuda, Maruzen, p. 80. When the multivalued image is compressed in accordance with the JBIG system, for example, a bit plane method or the like of slicing multivalue data bits and capturing them as binary data has been considered.

However, on the other hand, it is known that the handling of the image data as multivalued symbols rather than attempting to divide the image data into the bit planes is good in efficiency to compress the multivalued image. In view of these circumstances, a method of extending the arithmetic coding so as to be able to deal with the multivalued data as it is, has been proposed. This has been described on page 81 in the above-described reference, for example. In the binary arithmetic coding, the number line is divided into two to obtain codes. On the other hand, the extension of the data to the multivalues can be easily carried out by increasing the number of divisions of the number line.

FIG. 3 is a configurational view showing one example of a conventional coding device using a multivalue arithmetic coding method. In the drawing, reference numerals 1, 3, 4, 5, 6, 11, 14, 15, 16 and 17 respectively indicate an image input unit, an image analyzer, a probability estimate unit, a coding unit, a code output unit, image data, status data, probability estimated data, coded data and pixel-value data. Incidentally, the present drawing and FIG. 4 are ones obtained by suitably changing words or the like by reference to FIG. 1 in "IBM Journal of Research and Development," Vol. 32, No. 6, p. 754, 1988.

The coding device comprises the image input unit 1, the image analyzer 3, the probability estimate unit 4, the coding unit 5, and the code output unit 6. The image input unit 1 receives an input image from the outside and sends it to the image analyzer 3 as the image data 11. The image analyzer 3 receives the image data 11 therein and sends the value of a pixel to be coded to the coding unit 5 as the pixel-value data 17. Further, when reference is made to a peripheral pixel, the image analyzer 3 sends the value of the reference pixel to the probability estimate unit 4 as the status data 14. The probability estimate unit 4 receives the status data 14 therein and sends the probability estimated data 15 corresponding to the status data 14 to the coding unit 5. Thereafter, the probability estimate unit 4 updates the probability estimated data held therein. The coding unit 5 creates a codeword from the probability estimated data 15 and the pixel-value data 17 and sends it to the code output unit 6 as the coded data 16. The code output unit 6 outputs the coded data 16 as an output code.

FIG. 4 is a configurational view showing one example of a conventional decoding device using a multivalue arithmetic coding method. In the drawing, reference numerals 21, 22, 23, 24, 26, 31, 33, 34, 36 and 37 respectively indicate a code input unit, a codeword analyzer, an image analyzer, a probability estimate unit, an image output unit, coded data, status data, probability estimated data, image data and pixel-value data.

The code input unit 21 receives an input code from the outside and sends it to the codeword analyzer 22 as the coded data 31. The codeword analyzer 22 decodes the coded data 31 using the probability estimated data 34 sent from the probability estimate unit 24. Further, the codeword analyzer 22 sends the pixel-value data 37 corresponding to the result of decoding to the image analyzer 23. The image analyzer 23 creates an output image from the pixel-value data 37 and sends it to the image output unit 26 as the image data 36. When reference is made to each peripheral pixel, the image analyzer 23 sends the value of the pixel for reference to the probability estimate unit 24 as the status data 33. The image output unit 26 outputs the image data 36 to the outside as an output image.

The operation of the coding device based on the above construction will be described. FIG. 5 is a flowchart for describing one example of the operation of the general coding device. In S41, an image is first input to the image input unit 1. The image input unit 1 sends the result of input to the image analyzer 3 as the image data 11. In S42, the values of predetermined pixels for reference are integrated into a context by the image analyzer 3. In S43, the image analyzer 3 sends the status data 14 obtained by adding the value of each pixel to be coded to the context determined in S42 to the probability estimate unit 4. Next, the probability estimate unit 4 generates the probability estimate data 15 based on data about the context in the status data 14 and sends it to the coding unit 5. In S44, the coding unit 5 creates the coded data 16 from the probability estimate data 15 and the pixel-value data 17 by using the arithmetic coding method. In S45, the code output unit 6 outputs the coded data 16 to the outside. In S46, the probability estimate unit 4 updates data corresponding to the status data 14, of the probability estimate data stored in the probability estimate unit 4. At this time, the probability estimate unit 4 brings other probability estimate data up to date if necessary. It is judged in S47 whether all the input image data 11 have been coded. If the answer is found to be Yes in S47, then the routine procedure is terminated. If the answer is found to be No in S47, then the routine procedure is returned to S41 where non-processed data is subjected to the coding processing.

FIG. 6 is a flowchart for describing one example of the operation of the general decoding device. In S51, a code is first input to the code input unit 21. The input code is sent to the codeword analyzer 22 as the coded data 31. In S52, the values of predetermined pixels for reference are obtained from the pixel-value data 37 outputted from the codeword analyzer 22 and they are combined together to determine a context. In S53, the status data 33 obtained by adding an estimated value of a pixel to be coded to the context determined in S52 is sent to the probability estimate unit 24. The probability estimate unit 24 generates the probability estimated data 34 based on data about the context in the status data 33 and sends it to the codeword analyzer 22. In S54, the codeword analyzer 22 produces the pixel-value data 37 from the status data 34 and the coded data 31 by the decoding method using the arithmetic coding. In S55, the image analyzer 23 sends the pixel-value data 37 to the image output unit 26 as the image data 36. Further, the image output unit 26 outputs the image data 36 to the outside as an output image. It is judged in S57 whether all the input coded data 31 have been decoded. If it is judged in S57 that all the coded data 31 have been decoded, then the routine procedure is completed. If it is judged in S57 that non-processed data exists, then the routine procedure is returned to S51 where the non-processed data is subjected to the decoding processing.

Incidentally, portions surrounded by broken lines in FIGS. 5 and 6 respectively indicate the process common to the coding and decoding processes. In the above-described operation, the determination of the contexts in S42 and S52 is performed using the predetermined pixels for reference. At this time, the reference pixels may be adaptably changed according to the property of an image.

This multivalue arithmetic coding method has several problems. Such problems will next be described. The first problem is that a high calculation accuracy is required. This results from an increase in the number of divisions of the number line. Although a commonly-used computer is enough to provide the accuracy of calculation necessary for arithmetic coding, a serious problem arises when the calculation accuracy is speeded up under its reduction.

Since $2^8$=256 kinds of data are considered when, for example, 8-bit image data is directly handled, a procedure for dividing the number line into 256 and selecting one of them is required. If simply calculated, accuracies as high as about 100 times are required as compared with 1-bit data that may be divided into two.

Second and third problems result from the fact that the number of states suddenly increases in the case of the multivalue arithmetic coding as compared with the binary arithmetic coding. FIG. 7 is a view for describing a comparison between the number of states. Although the use of pixels for reference is an effective means for improving the C/R, the more the number of the reference pixels increases, the more the number of the states greatly increases correspondingly. JBIG makes use of the number of states corresponding to $2^{12}$=4096 as shown in FIG. 7, which is produced by setting the number of the reference pixels to 10 and making a further division of four states. However, if the same processing is effected on a 8-bit image, then the number of states reaches about $8 \times 10^{28}$. Even if the number of the pixels for reference is defined as two, the number of states reaches about 17 million as shown in FIG. 7.

The following two points are mentioned as specific problems incident to the increase in the number of states.

Large-capacity memories corresponding to the number of states are necessary.

It is difficult to estimate the probability of appearance of each state.

Since the number line is divided according to the probability of occurrences of respective states in the case of the arithmetic coding method, it is necessary to prepare memories for storing therein the probability of occurrences of the respective states. Therefore, when the number of the states increases, large-capacity memories corresponding to the number of the states are required. Further, since the number of the states increases as compared with the number of pixels of the image data used as the input data, it is difficult to estimate the probability that the respective states appear.

The reduction in the number of the states is directly linked with the reduction in C/R as it is. However, when a systematic restriction such as hardware or the like exists, there is a case in which it is desired to reduce the number of states even by making a reduction in efficiency. In the study on realization of such multivalue arithmetic coding, a method of omitting states in which an influence exerted on C/R is low and reducing the number of states to a less number of states is common. This operation is called "degeneracy."

Since the problem on the memory's capacity and the problem that it is difficult to estimate the probability of appearance of the states, result from the excessive increase in the number of states, both problems can be resolved simultaneously if it is possible to reduce the number of the states. As an example of such a study, there is known, for example, IEICE Technical Report, IE80-108 edited by Kato and Yasuda, entitled "A state degeneration method for source encoding of multi-level images". However, the degeneracy of the states basically needs a process of selecting states to be deleted. In the method of determining parameters for the degenerating method according to the image as described in the present reference, the load on the degeneration process is large.

A stationary degenerating system has been used in the reference entitled "High-Efficiency Coding System for Continuous-tone Image" by Imanaka, Ueno, Semasa and Tabe at the 1982 national meeting of Communication Department of IECE, S3-8. Since an assumption is made to the property of an image when such a stationary degenerating system is used, the dependence of C/R on the image is placed under apprehension.

Although there is a difference between the two systems according to the method due to the execution of the degeneration process, a problem arises that the reduction in C/R cannot be avoided in principle. This problem is unavoidable due to the conditions such as the systematic restrictions, but another problem is due to the degeneration process itself other than the multivalue arithmetic coding method. Further, the degeneration process cannot resolve the above-described problem on the accuracy of calculation.

SUMMARY OF THE INVENTION

With the foregoing in view, it is an object of the present invention to provide easy-to-realize multivalued image coding and decoding devices capable of reducing the accuracy of calculations and the number of memories and relieving the difficulties in probability estimate.

According to a first feature, there is provided an image coding device comprising: image disassembling means for disassembling an input multivalued image into a plurality of pairs of continuous bit planes and generating disassembled images composed of the plurality of pairs of continuous bit planes; image referring means for referring to peripheral pixels of coded other disassembled images with respect to objective pixels of the disassembled images generated by the image disassembling means; probability estimating means for estimating a probability estimated value corresponding to a probability that the values of the objective pixels are produced by the reference of the image referring means; and coding means for coding the disassembled images produced by the image disassembling means using the probability estimated value estimated by the probability estimating means.

According to a second feature, there is provided an image coding device comprising: image disassembling means for disassembling an input multivalued image into a plurality of pairs of continuous bit planes and producing disassembled images composed of the plurality of pairs of continuous bit planes; block dividing means for dividing the disassembled images produced by the image disassembling means into blocks each having a predetermined size; image referring means for referring to peripheral pixels of coded other disassembled images with respect to objective pixels of the disassembled images produced by the image disassembling means; probability estimating means for estimating a probability estimated value corresponding to a probability that the values of the objective pixels are produced by the reference of the image referring means; coding means for coding the disassembled images produced by the image disassembling means using the probability estimated value estimated by the probability estimating means; code quantity calculating means for calculating quantities of codes coded by the coding means every blocks divided by the block dividing means; and control means for discontinuing coding of the images divided by the block dividing means by the coding means when each code quantity calculated by the code quantity calculating means exceeds a predetermined threshold, the coding being subsequent to the coding of the images divided by the block dividing means.

According to a third feature, the above image coding device further comprises code quantity estimating means for estimating a code quantity of an objective pixel from the quantities of the codes coded by the coding means. The control means changes the threshold using the code quantity estimated by the code quantity estimating means.

According to a fourth feature, the coding means in the image coding devices is provided in plural form according to the number of the disassembled images produced by the image disassembling means.

According to a fifth feature, the coding means in the image coding devices codes pixels of the adjacent disassembled images, using the result of coding by the other coding means.

According to a sixth feature, the image coding device of the second feature further comprises same component separating means for separating disassembled images corresponding to the same components lying within the blocks divided by the block dividing means from the divided blocks. The coding means separately codes the same components separated by the same component separating means.

According to a seventh feature, there is provided an image decoding device comprising: codeword analyzing means for decoding an input code using a probability estimated value corresponding to a probability that the value of an objective pixel is produced, to thereby obtain images disassembled into a plurality of pairs of continuous bit planes of a multivalued image; image referring means for referring to peripheral pixels of decoded other disassembled images with respect to the disassembled images obtained by the codeword analyzing means; probability estimating means for estimating a probability estimated value by the reference of the image referring means; and image synthesizing means for synthesizing the disassembled images obtained by the codeword analyzing means into one image.

According to an eighth feature, there is provided an image decoding device comprising: codeword analyzing means for decoding an input code using a probability estimated value corresponding to a probability that the value of an objective pixel is produced, to thereby obtain images disassembled into a plurality of pairs of continuous bit planes of a multivalued image; image referring means for referring to peripheral pixels of decoded other disassembled images with respect to the disassembled images obtained by the codeword analyzing means; probability estimating means for estimating a probability estimated value by the reference of the image referring means; image synthesizing means for synthesizing the disassembled images obtained by the codeword analyzing means into one image; code quantity calculating means for calculating a quantity of the input code for each disassembled block; and control means for discontinuing decoding of the images divided into the blocks by the codeword analyzing means when the code quantity calculated by the code quantity calculating means exceeds a predetermined threshold, the decoding being subsequent to the decoding of the images divided into the blocks.

According to a ninth feature, the above image decoding device further comprises code quantity estimating means for estimating a code quantity of an objective pixel from the input code. The control means changes the threshold using the code quantity estimated by the code quantity estimating means.

According to a tenth feature, the codeword analyzing means in the image decoding devices is provided in plural form according to the number of the decoded disassembled images.

According to an eleventh feature, the codeword analyzing means in the image decoding devices decodes pixels of the adjacent disassembled images, using the result of decoding by the other codeword analyzing means.

According to a twelfth feature, in the image decoding device of the eighth feature, the input code is composed of a codeword having the same component for each block, which is indicative of each disassembled image, and other codewords. The codeword analyzing means decodes the same component for each block from the input code independent of other components. The image decoding device further comprises image merging means for merging the disassembled image corresponding to the same component which has been decoded by the codeword analyzing means and disassembled images corresponding to other components into one.

According to a thirteenth feature, the image decoding devices further comprise image processing means for effecting image processing for correcting the values of pixels in the image synthesized by the image synthesizing means within a quantization width by using peripheral pixels, on the pixels in the synthesized image.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The present invention will be described with reference to the accompanying drawings in which:

FIG. 1 is a block diagram showing a first embodiment of an image coding device of the present invention;

FIG. 2 is a block diagram illustrating a first embodiment of an image decoding device of the present invention;

FIG. 3 is a configurational block diagram depicting one example of a conventional coding device using a multivalue arithmetic coding method;

FIG. 4 is a configurational block diagram showing one example of a conventional decoding device using a multivalue arithmetic coding method;

FIG. 7 is a view for explaining a comparison in the number of states;

FIGS. 8A to 8D are views for explaining the disassembly of an image;

FIGS. 13A to 13D are views for describing one example of the way of taking reference pixels employed in the second embodiments shown in FIGS. 11 and 12;

FIG. 14 is a view for describing one example of the sequence of processes executed by the second embodiments shown in FIGS. 11 and 12;

FIG. 15 is a view for describing parts required to code and decode respective parts lying in a j-th line;

DESCRIPTION OF THE PREFERRED EMBODIMENTS

Figure 5:
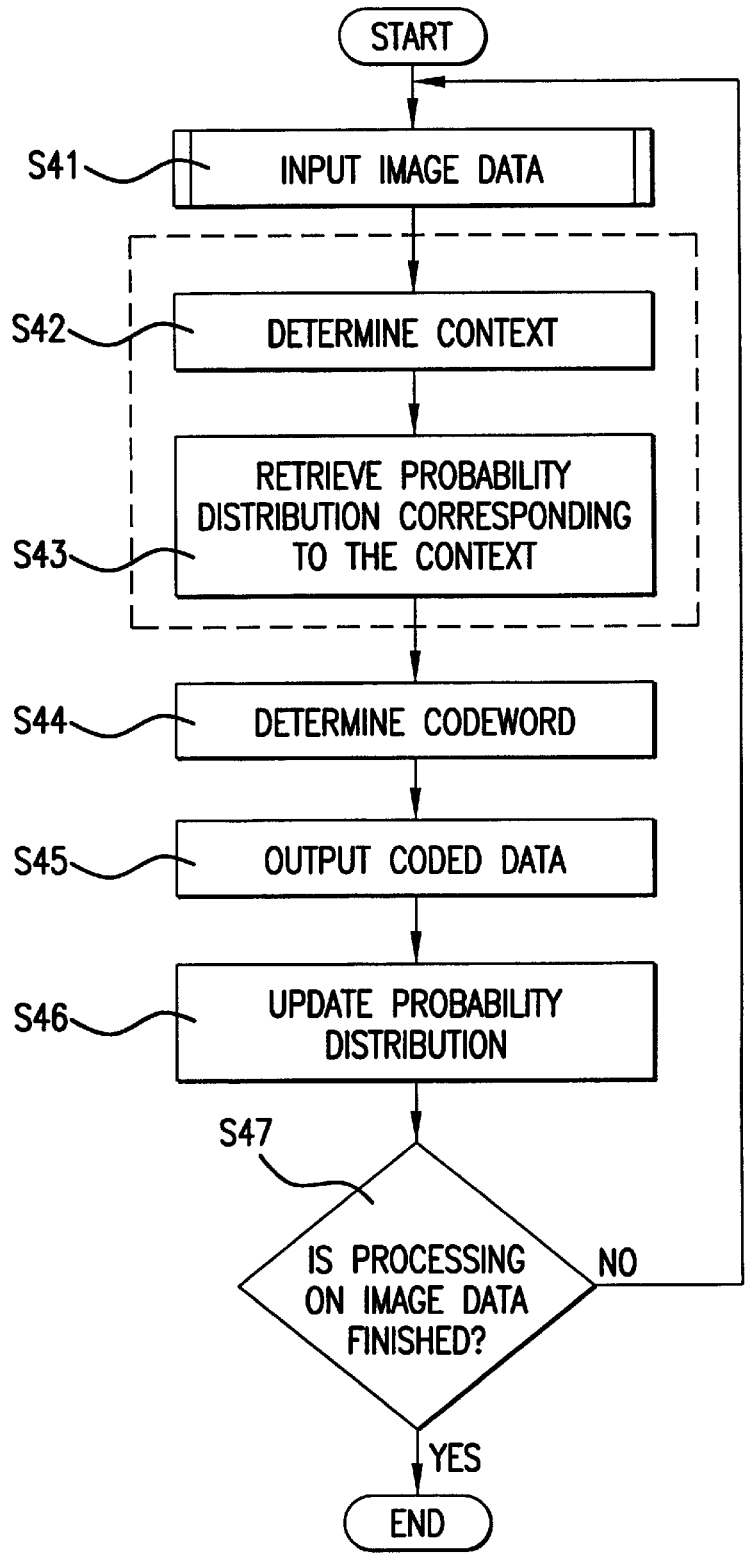
FIG. 5 is a flowchart for describing one example of the operation of a general coding device.

Preferred embodiments of the present invention will hereinafter be described in detail with reference to the accompanying drawings.

FIG. 1 is a block diagram showing a first embodiment of an image coding device of the present invention. In the drawing, the same elements of structure as those shown in FIG. 3 are identified by the same reference numerals and their description will be omitted. Reference numerals 2, 12 and 13 indicate an image disassembler, disassembled image data and disassembled pixel-value data respectively. An image input unit 1 receives an input image from the outside and sends it to the image disassembler 2 as image data 11. The image disassembler 2 disassembles the image data 11 input from the image input unit 1 using a predetermined method. Further, the image disassembler 2 sends pixel values disassembled into a pixel to be coded and a pixel for reference to an image analyzer 3 as disassembled image data 12.

The term "disassembly" indicates that an image is divided into several sets or pairs of bit planes. FIG. 8 is a view for describing the disassembly of the image. When one pixel shown in FIG. 8A by way of example is an image composed of 8 bits, the division of the image for every bit as shown in FIG. 8B is normally called "bit plane division." The term "disassembly" employed in the present invention indicates expansion of the present concept. The bit plane division corresponds to a specific example of "disassembly." As examples of "disassembly," may be mentioned one in which an image is divided into two pairs set in groups of upper and lower 4 bits as shown in FIG. 8C and one in which an image is divided into four pairs in total composed of two pairs set in groups of 3 bits from the high-order position and two pairs set by dividing the remaining 2 bits into respective one bits as shown in FIG. 8D. Of course, other disassembling methods may be used. The divided or disassembled respective parts will hereinafter be called a 0th part, a 1st part, a 2nd part, . . . from the high-order bit in turn.

In the above-described disassembling methods, pixels to be coded and reference pixels may be different from each other. For example, a method of coding 4th through 6th bits as pixels to be coded, is considered and a method of referring to 0th through 6th bits as reference pixels is considered.

Further, the disassembling method may be changed according to the positions of the reference pixels.

The image analyzer 3 receives therein the image data 12 disassembled by the image disassembler 2 and sends values of pixels to be coded in the disassembled image data 12 to a coding unit 5 as disassembled pixel-value data 13. When ambient or peripheral pixels are referred to, the image analyzer 3 sends values of reference pixels in the disassembled image data 12 to a probability estimate unit 4 as status data 14. The probability estimate unit 4 receives the status data 14 therein and sends probability estimate data 15 corresponding to the status data 14 to the coding unit 5. Thereafter, the probability estimate unit 4 updates the probability estimate data held therein. The coding unit 5 creates or generates a codeword from the probability estimate data 15 and the disassembled pixel-value data 13 and transmits it to a code output unit 6 as coded data 16. The code output unit 6 outputs the coded data 16 to the outside as an output code or sign.

FIG. 2 is a block diagram showing a first embodiment of an image decoding device of the present invention. In the drawing, the same elements of structure as those shown in FIG. 4 are identified by the same reference numerals and their description will be omitted. Reference numerals, 25, 32 and 35 indicate an image synthesizer, disassembled pixel-value data and disassembled image data respectively.

A code input unit 21 receives an input code from the outside and sends it to a codeword analyzer 22 as coded data 31. The input code is a code or sign coded for each disassembled image by the image coding device shown in FIG. 1. The codeword analyzer 22 decodes the coded data 31 using probability estimate data 34 sent from a probability estimate unit 24. Thereafter, the codeword analyzer 22 sends the disassembled pixel-value data 32 corresponding to the result of decoding to an image analyzer 23. The image analyzer 23 creates respective disassembled images from the disassembled pixel-value data 32 and sends the same to the image synthesizer 25 as disassembled image data 35. The disassembled image data 35 is different from the disassembled image data 12 obtained in the image coding device shown in FIG. 1 and does not need to include the values of the pixels for reference. When reference is made to peripheral pixels, the image analyzer 23 sends the values of the reference pixels to the probability estimate unit 24 as status data 33. The image synthesizer 25 integrates the disassembled image data 35 into one by a predetermined method and sends it to an image output unit 26 as image data 36. At this time, the synthesizing method employed in the image synthesizer 25 must correspond to the disassembling method used in the image coding device shown in FIG. 1. The image output unit 26 outputs the image data 36 to the outside as an output image.

Figure 6:
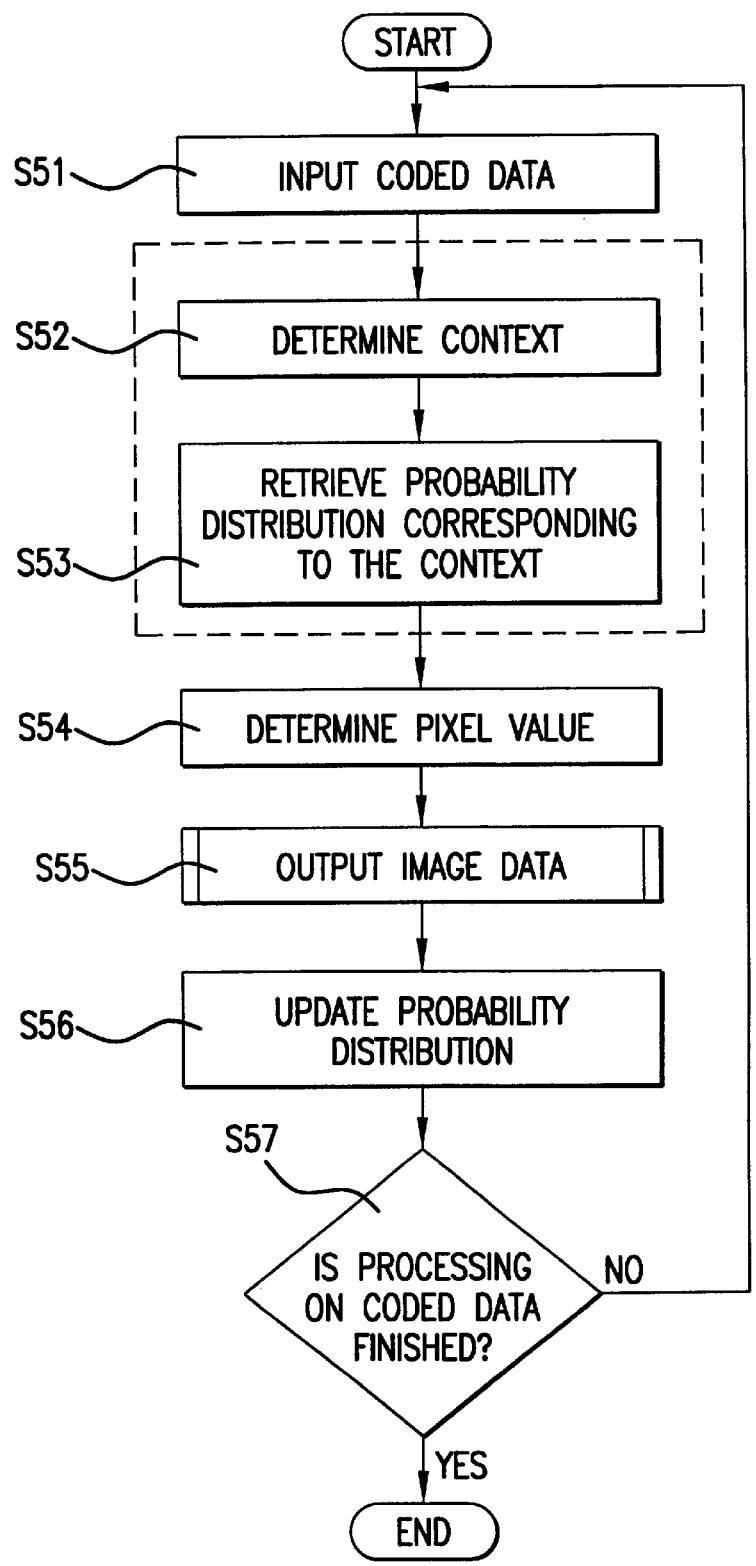
FIG. 6 is a flowchart for describing one example of the operation of a general decoding device.

One example of operations of the image coding device and the image decoding device according to the present invention will next be described. The entire operations of the image coding device and the image decoding device according to the present invention are substantially identical to those of the conventional image coding and decoding devices and are as illustrated in FIGS. 5 and 6. In the image coding device of the present invention, however, a process of S41 shown in FIG. 5 is different from that employed in the conventional image coding device. Further, the image decoding device of the present invention is different in process of S55 shown in FIG. 6 from the conventional image decoding device.

Figure 9:
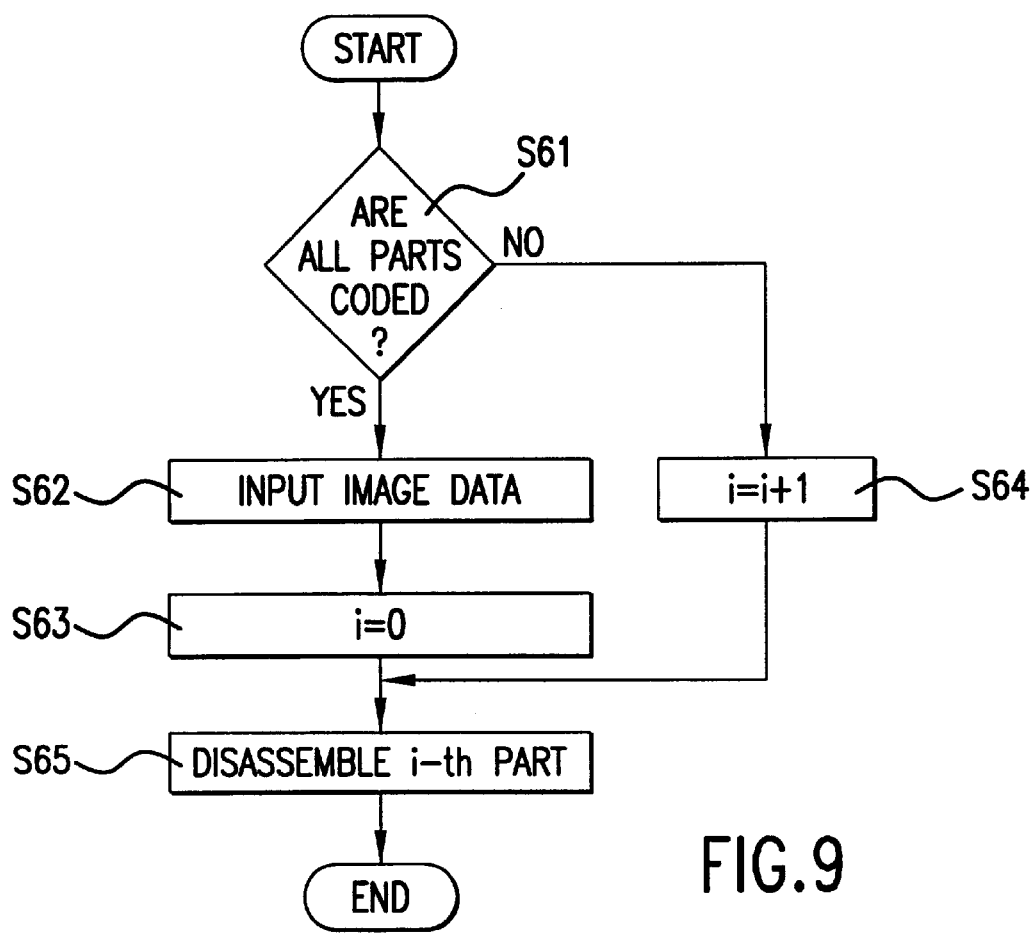
FIG. 9 is a flowchart for describing one example of the operation of an image data input process executed by the first embodiment shown in FIG. 1.

FIG. 9 is a flowchart for describing one example of operation of an image data input process executed by the first embodiment showing the image coding device of the present invention. The process shown in FIG. 9 indicates one example of the process executed in S41 of FIG. 5 by the image coding device of the present invention.

It is judged in S61 whether all the parts relative to a given pixel have been coded. When the coding of all the parts has been finished, the image input unit 1 inputs the image data 11 to the image analyzer 2 in S62. This processing is performed on a pixel basis. Next, 0 is substituted in a parameter i in S63. When it is judged in S61 that the coding of all the parts has not yet been finished, 1 is added to the parameter i in S64. In S65, the image analyzer 2 disassembles the image data 11 by the predetermined method to take out or extract an i-th part alone. Process steps of S42 through S46 shown in FIG. 5 are effected on the i-th part for each pixel subjected to code processing. Since the routine procedure is returned to S41 until the processing on the image data is finished, the process shown in FIG. 9 is executed again. The respective parts about the given pixel are successively taken out and coded by repeatedly executing such processing in this way. Such coding is effected on all the pixels every parts.

Figure 10:
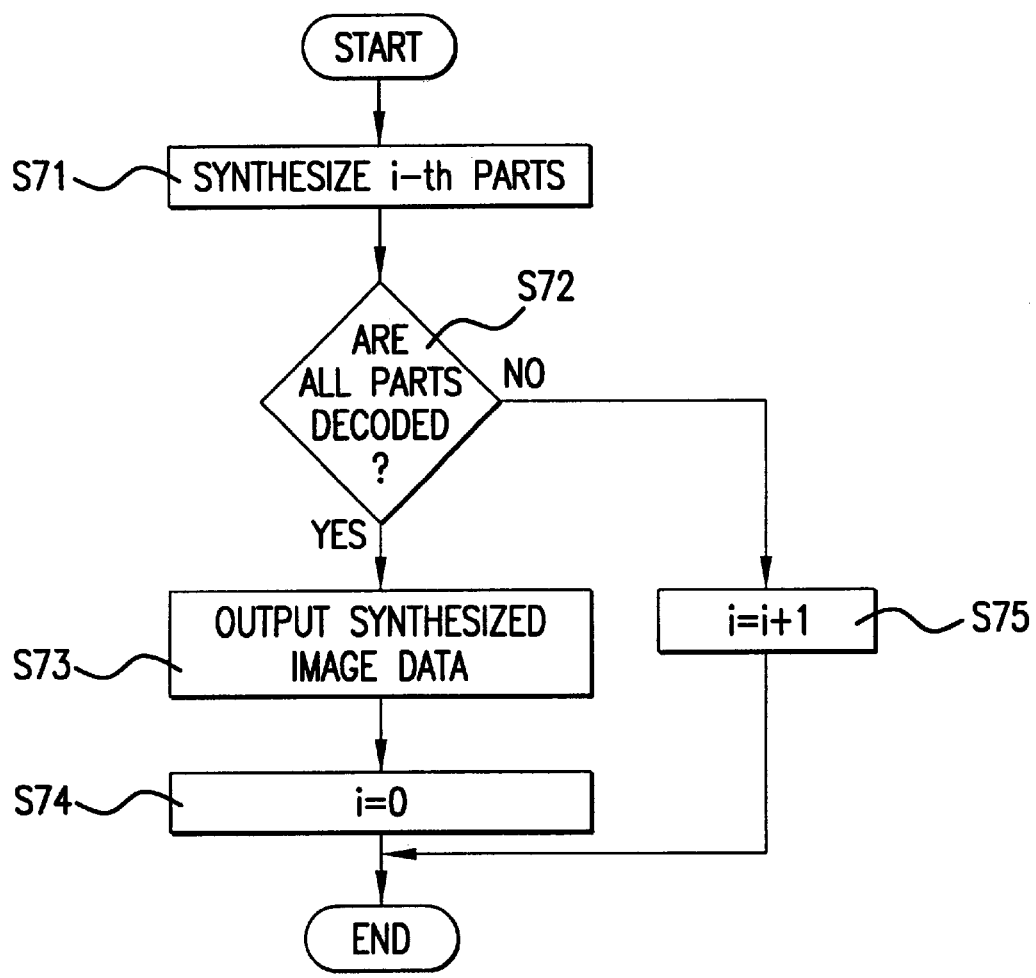
FIG. 10 is a flowchart for describing one example of the operation of an image data output process executed by the first embodiment shown in FIG. 2.

FIG. 10 is a flowchart for describing one example of operation of an image data output process executed by the first embodiment showing the image decoding device of the present invention. In the image decoding device of the present invention, a process shown in FIG. 10 shows one example of the process executed in S55 of FIG. 6. In the image coding device as described above, the individual pixels are coded every parts. Therefore, coded data input in S51 of FIG. 6 indicates a code with respect to a given part for a given pixel. In S52 through S54, the code is decoded to determine the value of the given part for the given pixel. Now consider here that the value of the i-th part for the given pixel is determined and sent to the image synthesizer 25 as the disassembled image data 35.

In S71 shown in FIG. 10, the image synthesizer 25 synthesizes the disassembled image data 35 by using the predetermined method as the i-th part. It is judged in S72 whether all the parts have been decoded with respect to each under-processing pixel. If it is judged in S72 that the decoding of all the parts has been finished, then the routine procedure proceeds to S73 where the image synthesizer 25 sends the image data 11 synthesized by the image synthesizer 25 to the image output unit 26 from which it is output to the outside. Next, 0 is substituted in the parameter i in S74. If the answer is found to be No in S72, then the routine procedure proceeds to S75 where 1 is added to the parameter i.

After a probability distribution has been updated by the probability estimate unit 24 in S56 of FIG. 6, it is judged in S57 whether the processing on coded data has been finished. When non-processed coded data exists, the routine procedure is returned to S51 where the next coded data is processed. The next coded data indicates a (i+1)th part for a given pixel or a 0th part for the next pixel. The individual parts are decoded and synthesized for every parts in this way. Such a synthesis process is effected on all the pixels. This algorithm is terminated at the time of completion of the synthesis of all the parts for all pixels.

The way of implementing the processing on coding and decoding the respective parts for the pixels is considered to be roughly divided into the following two methods.

1) After completion of the processing on all the parts for the same pixel, the processing proceeds to the next pixel.

2) After completion of the processing on all the pixels at the same part, the processing proceeds to the next part.

The above description has been made of the method 1). However, either one of them may be used in practice. According to the method 1), the image data is easily input. However, when it is desired to refer to pixels for other parts, reference can be made only to the already-processed pixels. According to the method 2), the values of the already-processed parts for other pixels can be also referred to. It is however necessary to input the image data plural times. It is also necessary to take countermeasures such as the provision of an image memory, the input of image data plural times or a contrivance of the sequence of processing, etc. Thus, the methods 1) and 2) may be used according to the purpose and device configuration. As an alternative to the two methods, a method of dividing an image into blocks and processing it in block units without processing it in pixel units or a method of processing several parts on a batch basis may be used. Alternatively, different parts for different pixels may be processed in order in accordance with a given sequence.

Figure 11:
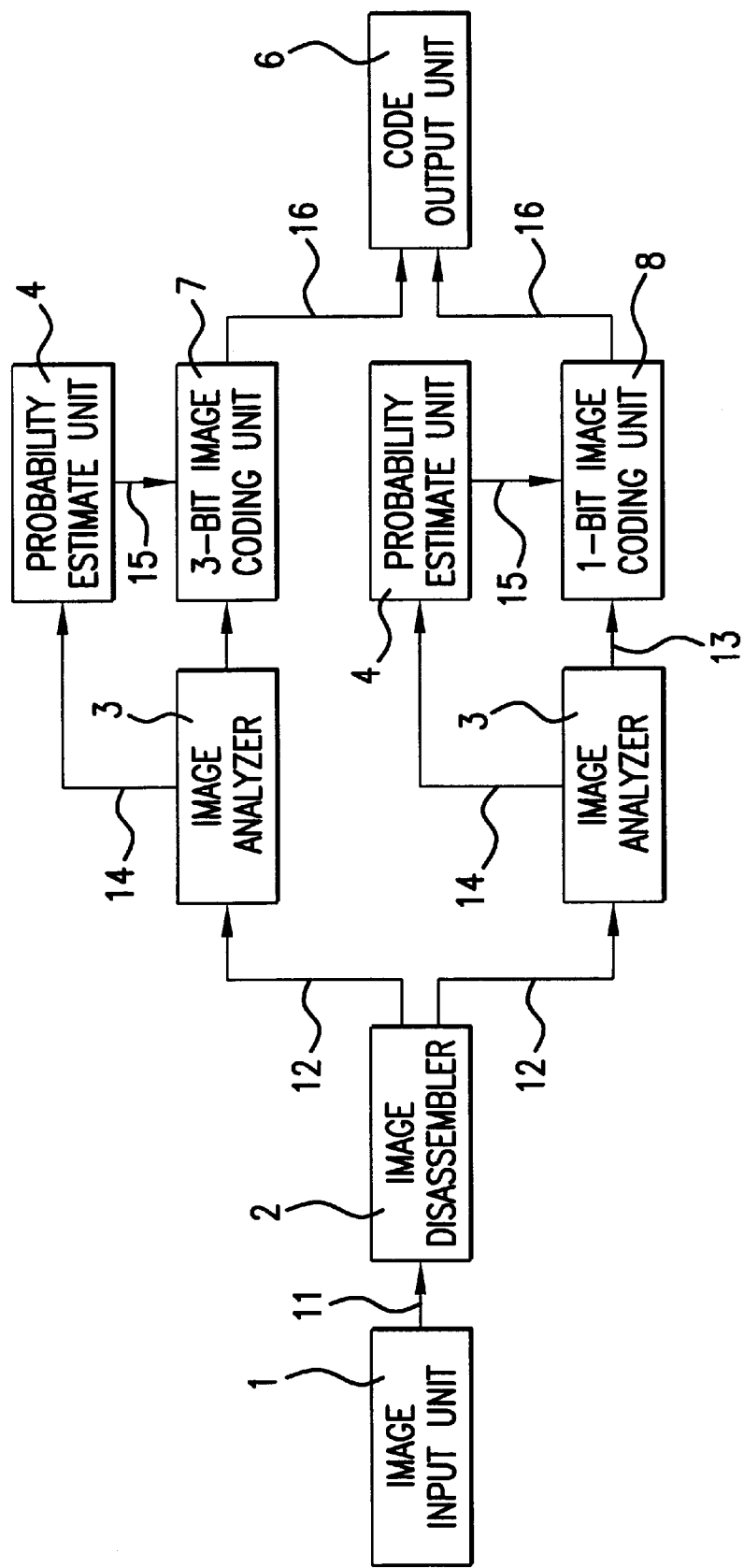
FIG. 11 is a block diagram showing a second embodiment of an image coding device of the present invention.

FIG. 11 is a block diagram showing a second embodiment of an image coding device of the present invention. In the drawing, the same elements of structure as those shown in FIG. 1 are identified by the same reference numerals and their description will be omitted. Reference numerals 7 and 8 respectively indicate a 3-bit image coding unit and a one-bit image coding unit. The present embodiment shows, as a specific example of the first embodiment, a configurational example in which the disassembly shown in FIG. 8D is performed. The second embodiment is basically identical in configuration to the first embodiment and is different from the first embodiment in that the two kinds of image coding units are used properly.

The 3-bit image coding unit 7 corresponds to a coding unit designed so as to be able to code 3-bit data. Similarly, the one-bit image coding unit 8 also corresponds to a coding unit designed so as to be able to code binary data.

An image disassembler 2 divides an image into parts as shown in FIG. 8D. Respective 3-bit data for the 0th and 1st parts are sent to a 3-bit image coding unit 7 through one image analyzer 3, whereas respective binary data for the 2nd and 3rd parts are sent to the one-bit image coding unit 8 through the other image analyzer 3. At this time, data about the values of reference pixels included in the disassembled image data 12 are not necessarily limited to 3 bits or one bit. The way of taking the reference pixels will be described later.

In the configuration shown in FIG. 11, the image analyzers 3 and probability estimate units 4 are respectively provided so as to correspond to the 3-bit image coding unit 7 and the one-bit image coding unit 8. It is however unnecessary to provide them in correspondence with each of the 3-bit image coding unit 7 and the one-bit image coding unit 8. Alternatively, one image analyzer 3 and one probability estimate unit 4 may be constructed so that disassembled pixel-value data 13 and probability estimated data 15 are sent to the 3-bit image coding unit 7 and the one-bit image coding unit 8.

The second embodiment showing the image coding device is identical in operation to the first embodiment referred to above. However, the 0th and 1st parts for the individual pixels are subjected to coding processing by the 3-bit image coding unit 7, and the 2nd and 3rd parts are subjected to coding processing by the one-bit image coding unit 8.

The 3-bit image coding unit 7 and the one-bit image coding unit 8 can be operated separately from each other. Therefore, the 0th or 1st part composed of the 3-bit data and the 2nd or 3rd part composed of the one-bit data can be parallel-processed. The 3-bit image coding unit 7 and the one-bit image coding unit 8 respectively control the data about the values of the reference pixels included in the disassembled image data 12 sent from the image analyzer 2. Further, a code output unit 6 may rearrange coded data 16 outputted from the 3-bit image coding unit 7 and the one-bit image coding unit 8 according to a predetermined code sending sequence.

Figure 12:
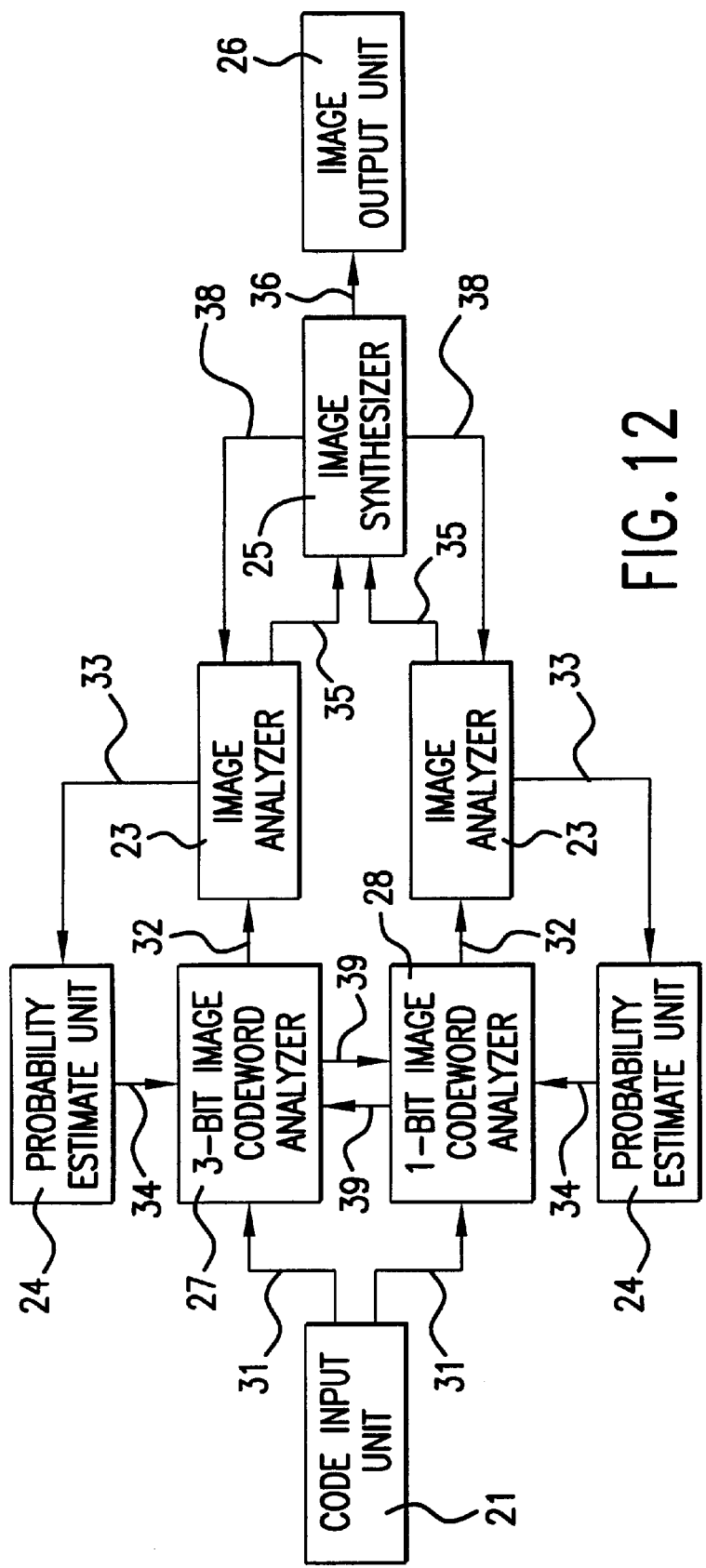
FIG. 12 is a block diagram illustrating a second embodiment of an image decoding device of the present invention.

FIG. 12 is a block diagram showing a second embodiment of an image decoding device of the present invention. In the drawing, the same elements of structure as those shown in FIG. 2 are identified by the same reference numerals and their description will be omitted. Reference numerals 27, 28, 38 and 39 respectively indicate a 3-bit image codeword analyzer, a one-bit image codeword analyzer, reference pixel data and control data. The present embodiment shows the image decoding device for decoding the signs or codes sent from the image coding device shown in FIG. 11. The present embodiment is configured so as to decode the codes disassembled and coded as shown in FIG. 8D in a manner similar to the second embodiment showing the aforementioned image coding device.

The 3-bit image codeword analyzer 27 corresponds to a codeword analyzer having the function of being able to decode coded 3-bit data. Similarly, the one-bit image codeword analyzer 28 indicates a codeword analyzer having the function of being able to decode coded one-bit data. Further, the 3-bit image codeword analyzer 27 and the one-bit image codeword analyzer 28 respectively receive therein the same coded data 31 simultaneously from a code input unit 21. At this time, communications are made between the 3-bit image codeword analyzer 27 and the one-bit image codeword analyzer 28 through the control data 39 thereby to determine by which analyzer the coded data 31 should be decoded. In the case of, for example, a processing sequence in which the next pixel is processed after completion of the processing on all the parts for the same pixel, the order in which the one-bit image codeword analyzer 28 decodes two parts after completion of the decoding of two parts by the 3-bit image codeword analyzer 27 is determined in advance and the control between the two analyzers is made by the control data 39.

In the present embodiment, an image synthesizer 25 combines disassembled image data 35 outputted via image analyzers 23 from the 3-bit image codeword analyzer 27 and the one-bit image codeword analyzer 28 into one. Further, the image synthesizer 25 sends the combined image data 36 to an image output unit 26 and transmits the value of a reference pixel selected from the already-synthesized image data to each image analyzer 23 as the reference pixel data 38. Each image analyzer 23 can refer to other parts in response to the reference pixel data 38 and sends the result of reference to a probability estimate unit 24 as status data 33.

In the configuration shown in FIG. 12, the operation of the second embodiment is controlled by making the communications between the 3-bit image codeword analyzer 27 and the one-bit image codeword analyzer 28 through the control data 39. However, the operation of the second embodiment is not necessarily limited to this. Alternatively, communications may be made between the code input unit 21 and each of the 3-bit image codeword analyzer 27 and the one-bit image codeword analyzer 28 so as to perform the same control as described above.

Further, the image analyzer 23 and the probability estimate unit 24 are provided so as to correspond to each of the 3-bit image codeword analyzer 27 and the one-bit image codeword analyzer 28. It is however unnecessary to provide them in correspondence with each of the 3-bit image codeword analyzer 27 and the one-bit image codeword analyzer 28. Alternatively, one image analyzer 23 and one probability estimate unit 42 may be constructed so as to send probability estimate data 34 to the 3-bit image codeword analyzer 27 and the one-bit image codeword analyzer 28, respectively.

The second embodiment showing the image decoding device is identical in operation to the first embodiment described above. However, codes of 0th and 1st parts for individual pixels are subjected to decoding processing by the 3-bit image codeword analyzer 27 and codes of 2nd and 3rd parts are subjected to decoding processing by the one-bit image codeword analyzer 28. Reference can be made even to the values of other parts as well as to those of the corresponding parts as how to take reference pixels.

The 3-bit image codeword analyzer 27 and the one-bit image codeword analyzer 28 can be operated separately from each other. Therefore, the decoding processing effected on the code of the 0th or 1st part and the decoding processing effected on the code of the 2nd or 3rd part can be executed on a parallel basis. A plurality of codes are inputted to the code input unit 21 so as to be divided between the 3-bit image codeword analyzer 27 and the one-bit image codeword analyzer 28. Further, the image synthesizer 25 may combine the disassembled image data 35 outputted via the image analyzers 23 from the 3-bit image codeword analyzer 27 and the one-bit image codeword analyzer 28 into one according to each part.

Each of the second embodiments showing the image coding device and the image decoding device described above shows the case in which the disassembly shown in FIG. 8D is performed. However, since the number of bits to be disassembled is 3 bits and 1 bit in the present embodiment, the 3-bit image coding unit 7 and the one-bit image coding unit 8, and the 3-bit image codeword analyzer 27 and the one-bit image codeword analyzer 28 were used. If the number of the bits to be disassembled varies, then the required coding unit and codeword analyzer are provided correspondingly. If bits are disassembled into 4 bits, 2 bits, 1 bit and 1 bit, for example, then a 4-bit image coding unit, a 2-bit image coding unit and a 1-bit image coding unit, and a 4-bit image codeword analyzer, a 2-bit image codeword analyzer and a 1-bit image codeword analyzer may be provided. In this case, however, the number of the coding units and the number of the codeword analyzers increase and hence a disadvantage occurs in terms of the scale of a circuit and cost. When the pixel is disassembled into the two parts every 4 bits or the four parts every 2 bits as shown in FIG. 8A, only one coding unit and one codeword analyzer may be provided as described in the above-described first embodiment. However, when coding and decoding processes are discontinued in the course of the processes as will be described later as a third embodiment, the number of bits for parts near the low-order bits may preferably be reduced. A disassembling method is determined in consideration of these conditions and the coding unit and the codeword analyzer may be provided.

FIG. 13 is a view for describing one example of the way of taking reference pixels employed in each of the second embodiments showing the image coding device and image decoding device of the present invention. FIG. 14 is a view for describing one example of the sequence of processes executed by the same second embodiment. In the example of the way of taking the reference pixels, shown in FIG. 13, reference is made even to other parts. Since reference cannot be made to an unknown pixel value upon decoding when the coding and decoding processes are performed in accordance with the method of processing the next pixel after completion of the processing on all the parts for the same pixel, it is not possible to make a reference to the pixel after the objective pixel. In the method of proceeding to the next part after completion of the processing on all the pixels for the same part, reference can be made to the parts which processing has already been finished, even in the case of the pixel subsequent to the objective pixel, whereby C/R can be improved. In this case, it is however necessary to hold all the parts that has been processed, in a memory. Thus, although the former and latter methods have advantages and disadvantages respectively, it is possible to take advantages of the two by contriving the sequence of processing.

The way of taking the reference pixels, which is shown in FIG. 13, is constructed so as to refer to the already-processed parts alone assuming that processing is performed in accordance with the processing sequence shown in FIG. 14. In FIG. 13, respective rectangles indicate pixels respectively. The number of bits to refer to is set to 12 and the positions of bits for respective pixels to see are shown in the rectangles. A number of bits to see may preferably be disposed for pixels deep relevant to the bits. The objective pixel is a pixel located in the center of the rectangle and subjected to hatching. The coding and decoding processes are performed while the objective pixel moves from left to right across the line or row. When a process to be effected on each pixel at the right end is completed, each pixel at the left end in the next row is processed as an objective pixel.

The processing sequence will be described using FIG. 14. The pixels vertically aligned in a row in FIG. 13 are shown in FIG. 14 and a bit string of respective pixels is shown in the horizontal direction. The processing sequence is indicated by figures and lines with arrows. Now consider that the processing sequence proceeds to the processing on the next part after completion of the processing on pixels in one line for the same parts.

Firstly, a 0th part in a 0th line is processed, followed by a 1st part in the same line. Next, the 0th part in a 1st line is processed, followed by the 1st part in the same 1st line. Thereafter, the line is returned to the 0th line, where a 2nd part is processed. Subsequently, the 0th part, 1st part in a 2nd line, a 2nd part in the 1st line, a 3rd part in the 0th line, . . . are successively processed.

When it is desired to process the 0th part in the 1st line, for example, the 0th and 1st parts in the 0th line have been already processed. Further, the 0th part prior to the objective pixel in the 1st line has also been processed. Therefore, since reference can be made to these parts, a 0th part for 3 pixels in the immediately preceding line and a 0th part for the immediately preceding pixel can be set for reference as shown in FIG. 13A. Further, when a 1st part in a 1st line is processed, 0th and 1st parts in a 0th line and a 0th part in the 1st line have been already processed. Further, the 1st part antecedent to objective pixels in the 1st line has also been processed. Therefore, since reference can be made to these parts, a 1st part for the immediately above pixel and a 5th bit for the diagonally upper pixel, and 0th and 1st parts for the immediately preceding pixel and 2nd bit in the 0th part for the immediately following pixel can be set for reference as shown in FIG. 13B. FIGS. 13C and 13D are similar to the above. Reference bits corresponding to 12 bits are respectively disposed in FIGS. 13C and 13D.

When processing is performed in accordance with the processing sequence shown in FIG. 14 and the reference pixels are disposed as shown in FIG. 13, a working image memory may have three lines at the minimum. If such an approach is effected even on a main scanning direction (line direction), then the image memory can be economically reduced in number. Thus, the less-provided image memories can refer even to bits in other parts.

In the example shown in FIG. 13, which describes the way of taking the reference pixels, the reference pixels were used as 12 bits. The number of states at this time is $2^{15}=32768$ at the maximum. If compared with the case in which the number of the states reaches about 17 million upon the multivalue arithmetic coding of 8 bits as shown in FIG. 7, it is understood that the number of the states can be greatly reduced. Even when 16 bits for the immediately above and the immediately preceding pixel are handled as the reference pixels in a manner similar to the multivalue arithmetic coding of 8 bits, the number of the states can be reduced to $\frac{1}{16}$ by disassembling data into 4 bits as shown in FIG. 8C as compared with the case where the multivalue arithmetic coding is performed as 8 bits remain held. It is thus apparent that according to the first and second embodiments, the number of the states can be reduced and problems incident to the reduction in state number can be resolved.

In the first and second embodiments, the coding unit and the codeword analyzer can be also disposed every parts and parallel-operated. If, for example, the way of taking the reference pixels as shown in FIG. 13 is adopted and processing is made in accordance with the processing sequence shown in FIG. 14 under such a construction, it is then possible to parallel-activate all the coding units and codeword analyzers. FIG. 15 is a view for describing parts required to code and decode respective parts in a j-th line. Respective parts in a (j−1)th line to a (j+1)th line are required as shown in FIG. 15 to perform the way of taking the reference pixels at the j-th line as shown in FIG. 13. Specifically, a 0th part in the (j−1)th line is necessary to process a 0th part in the j-th line, a 1st part in the (j−1)th line and the 0th part in the j-th line are required to process a 1st part in the j-th line, 1st and 2nd parts in the (j−1)th line, the 1st part in the j-th line and a 1st part in the (j+1)th line are required to process a 2nd part in the j-th line, and the 1st through 3rd parts in the (j−1)th line, the 1st and 2nd parts in the j-th line and a 2nd part in the (j+1)th line are necessary to process a 3rd part in the j-th line. Further, the already-processed pixels in a part in the j-th line while being under processing at present, are necessary. Thus, when reference is made to the pixels in the different parts, the respective parts cannot be simply made parallel independent of each other.

Figure 16:
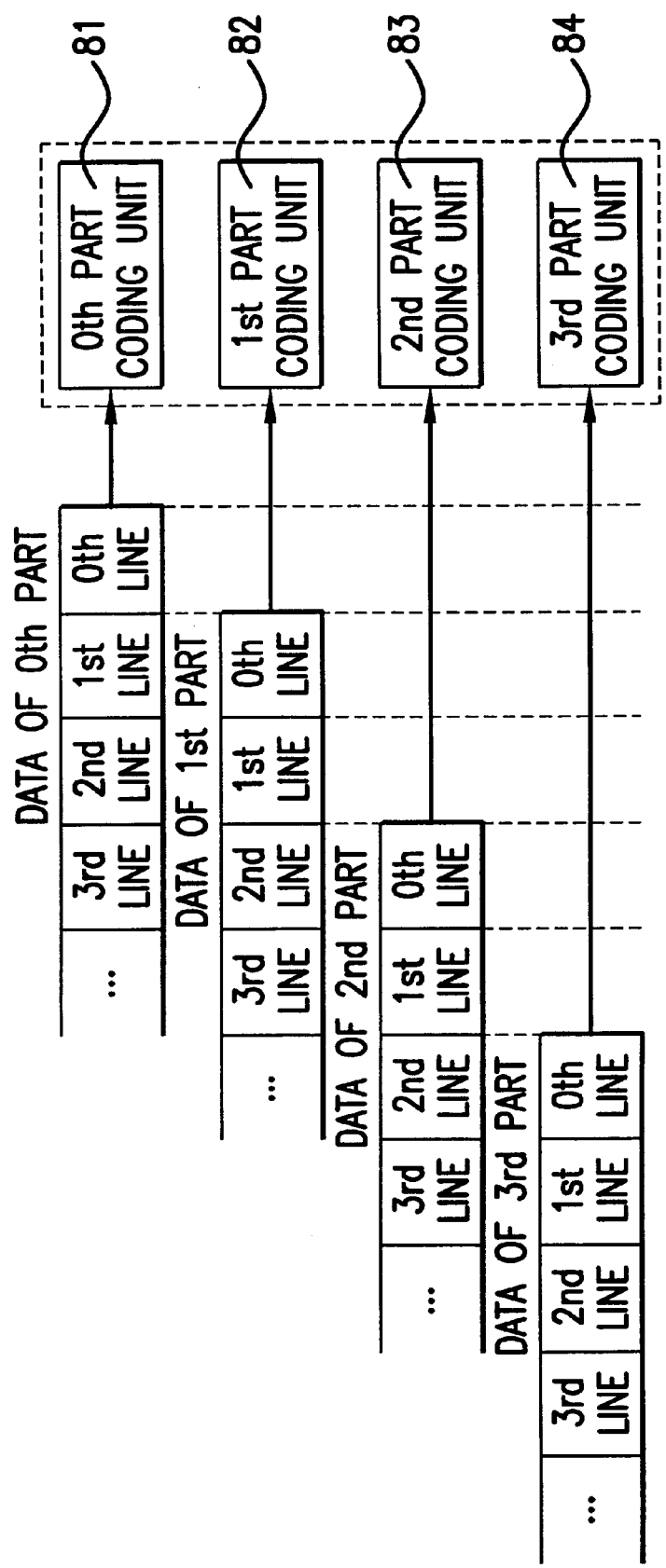
FIG. 16 is a fragmentary explanatory view showing a modification of the second embodiment of the image coding device of the present invention.

FIG. 16 is a fragmentary explanatory view showing a modification of the second embodiment of the image coding device of the present invention. In the same drawing, reference numerals 81, 82, 83 and 84 respectively indicate a 0th part coding unit, a 1st part coding unit, a 2nd part coding unit and a 3rd coding unit. The 0th part coding unit 81 and the 1st part coding unit 82 respectively include the image analyzer 3, the probability estimate unit 4 and the 3-bit image coding unit 7 shown in FIG. 11. The 2nd part coding unit 83 and the 3rd part coding unit 84 respectively include the image analyzer 3, the probability estimate unit 4 and the one-bit image coding unit 8 shown in FIG. 11.

Let's now assume that the respectively parts are processed in the same time for simplicity of illustration. When it is desired to code the 2nd part in the j-th line as viewed from FIG. 15 by way of example, it is understood that the coding of the 1st part must be finished up to the (j+1)th line. Accordingly, the 2nd part can be processed simultaneously with the 1st part if the processing on the 2nd part is delay by two lines from the processing on the 1st part. Similarly, the processing on the 1st part in the j-th line may be delayed by one line from the processing on the 0th part and the 3rd part in the j-th line may be delayed by two lines from the processing on the 2nd part. Based on the above, the respective part coding units are operated on a parallel basis by shifting timing provided to input data in respective lines to their corresponding part coding units as shown in FIG. 16. Incidentally, decoding can be performed in exactly the same as described above. Thus, even when reference is made to the different parts, the coding units can be activated in parallel by providing the coding units every parts. Although the entire circuit is made large in scale, the coding and decoding processes can be done at high speed.

Figure 17:
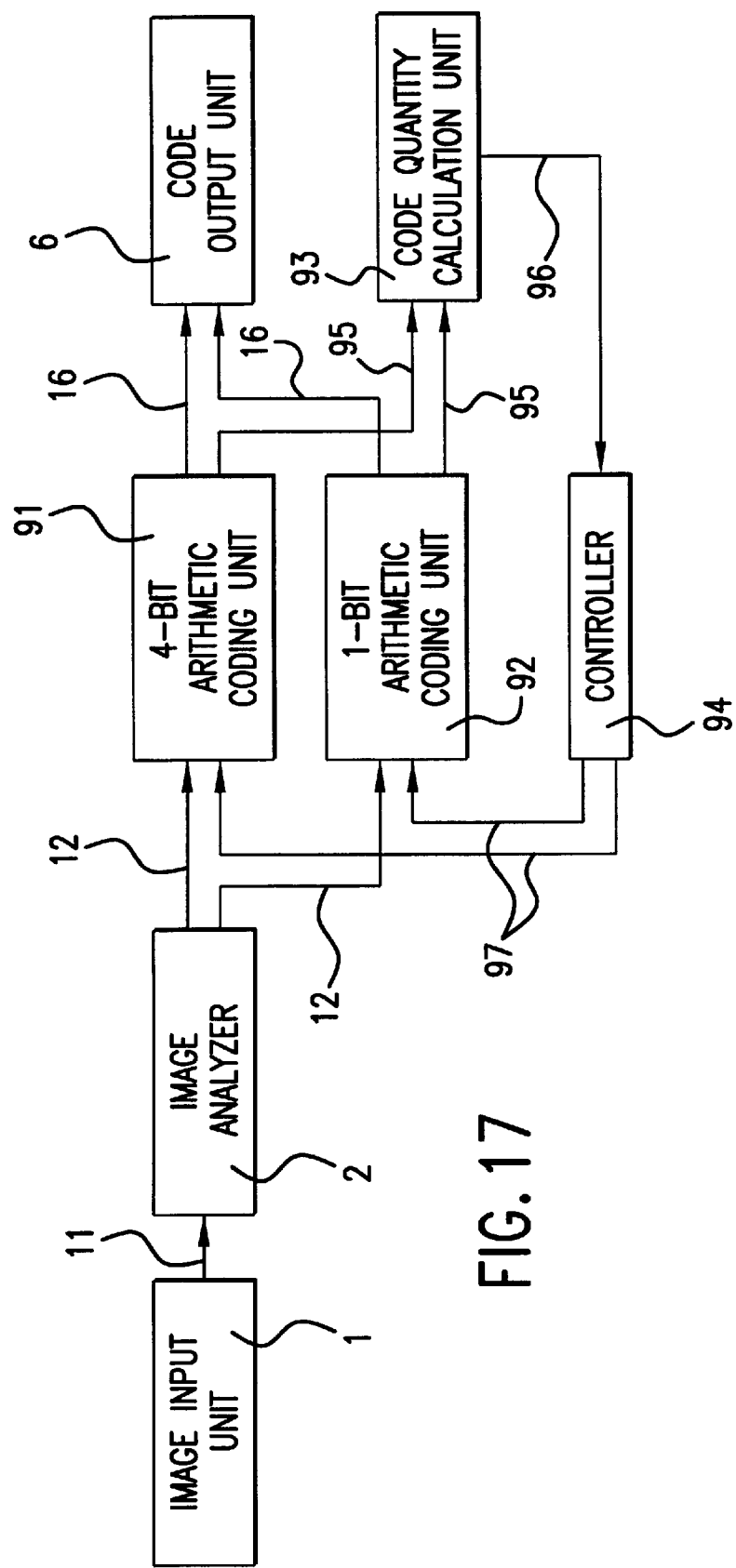
FIG. 17 is a block diagram showing a third embodiment of an image coding device of the present invention.

FIG. 17 is a block diagram showing a third embodiment of an image coding device of the present invention. In the same drawing, the same elements of structure as those shown in FIGS. 1 and 11 are identified by like reference numerals and their description will be omitted. Reference numerals 91, 92, 93, 94, 95, 96 and 97 respectively indicate a 4-bit arithmetic coding unit, a 1-bit arithmetic coding unit, a code quantity calculation unit, a controller, data about code quantity, data about the total code quantity, and control data. The present embodiment is characterized in that the present invention is applied to lossy coding. In the present embodiment, a description will be made of a disassembly example in which a 0th part is set as 4 bits and 1st through 4th parts are respectively set as 1 bit.

The 1-bit arithmetic coding unit 92 includes the image analyzer 3, the probability estimate unit 4 and the 1-bit image coding unit 8 shown in FIG. 11. Arithmetic coding is used as a coding method. The 4-bit arithmetic coding unit 91 has the same configuration as the 1-bit arithmetic coding unit 92. The 1-bit image coding unit 8 in the 4-bit arithmetic coding unit 91 is functionally changed so as to be able to deal with 4-bit data and the arithmetic coding is used as the coding method. The 4-bit arithmetic coding unit 9 and the 1-bit arithmetic coding unit 92 perform processing in accordance with a command of control data 97 sent from the controller 94 to thereby send the processed code to a code output unit 6 as coded data 16 and transmit the amount or quantity of the code to the code quantity calculation unit 93 as code-quantity data 95.

The code quantity arithmetic unit 93 calculates the sum of code quantities corresponding to an image while being under processing at present, based on the code-quantity data 95 sent from the 4-bit arithmetic coding unit 91 and the 1-bit arithmetic coding unit 92. Thereafter, the code-quantity calculation unit 93 sends the result of calculation to the controller 94 as the total code-quantity data 96. The controller 94 controls respective portions through the control data 97 based on the total code-quantity data 96.

Figure 18:
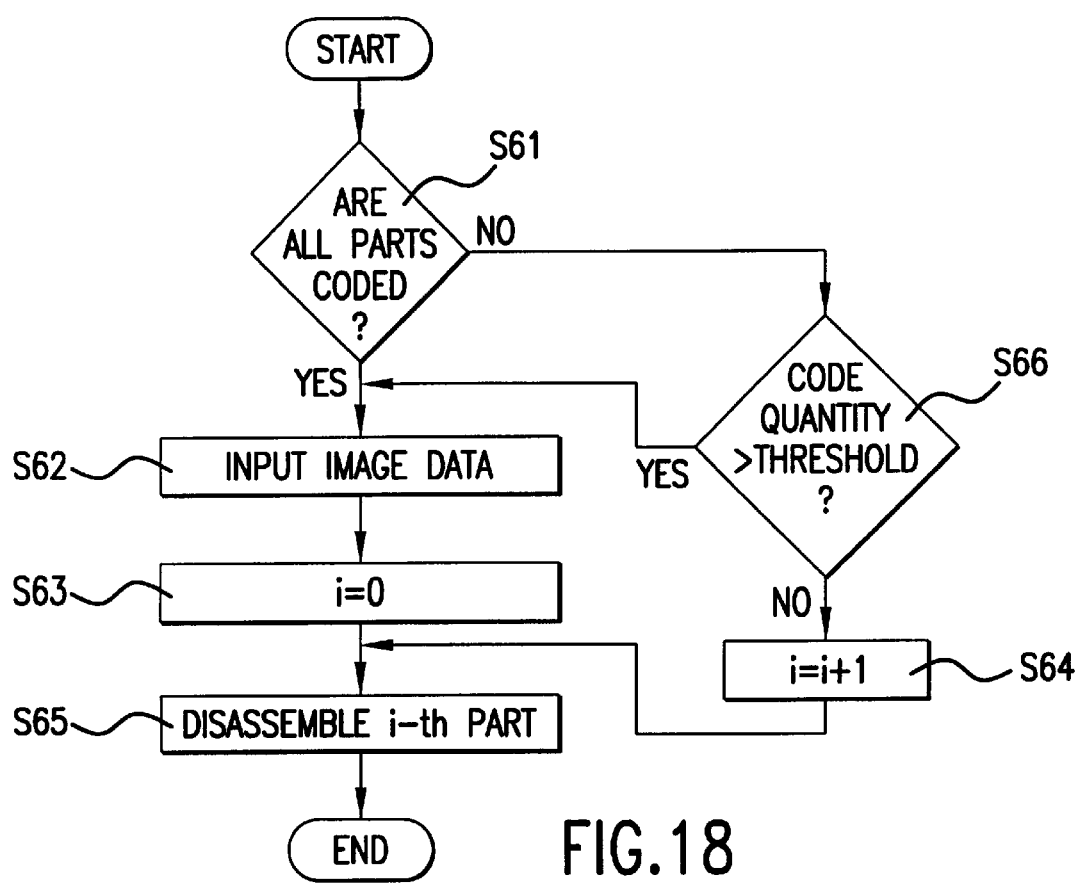
FIG. 18 is a flowchart for describing one example of the operation of an image data input process executed by the third embodiment shown in FIG. 17.

One example of the operation of the third embodiment of the image coding device of the present invention will next be described. The entire operation of the present embodiment is substantially as shown in FIG. 5. However, the present embodiment is different in the process of S41 in FIG. 5 from the previous embodiment. The process of S41 in FIG. 5 is shown in FIG. 18. FIG. 18 is a flowchart for describing one example of the operation of an image data input process executed by the third embodiment of the image coding device of the present invention. Process steps of S61 through S65 in the process shown in FIG. 18 are the same as the process steps shown in FIG. 9.

It is judged in S61 whether all the parts have been coded. If the answer is found to be Yes in S61, then the routine procedure proceeds to S62 where image data is inputted. Further, a variable i indicative of the number of each part is set to 0. Thereafter, the 0th part is subjected to disassembling in S65. When non-processed parts exist in S61, the routine procedure proceeds to S66.

In S66, the controller 94 makes a decision as to whether the total code-quantity data 96 sent from the code quantity calculation unit 93 exceeds a predetermined threshold. If it is judged in S66 that the total code-quantity exceeds the threshold, then processing on the subsequent parts is discontinued and the routine procedure proceeds to S62 where a new image is processed. If the answer is found to be No in S66, then the routine procedure proceeds to S64 where only 1 is added to the variable i. In S65, the next part in an image while being under processing, is disassembled and part coding is continuously performed.

Figure 19:
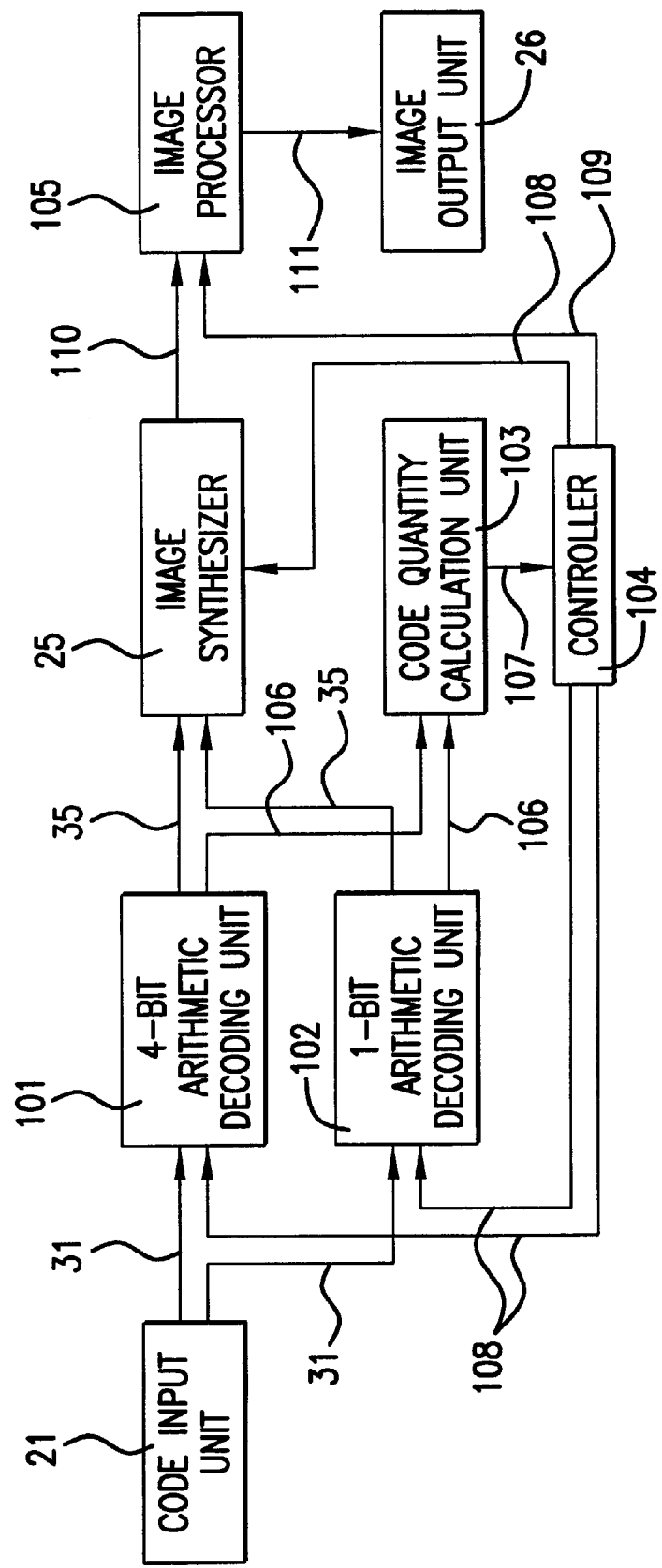
FIG. 19 is a block diagram illustrating a third embodiment of an image decoding device of the present invention.

FIG. 19 is a block diagram showing a third embodiment of an image decoding device of the present invention. In the drawing, the same elements of structure as those shown in FIGS. 2 and 12 are identified by the same reference numerals and their description will be omitted. Reference numerals 101, 102, 103, 104, 105, 106, 107, 108, 109, 110 and 111 respectively indicate a 4-bit arithmetic decoding unit, a 1-bit arithmetic decoding unit, a code quantity calculation unit, a controller, an image processor, code-quantity data, total code-quantity data, control data, quantization width data, decoded image data, and processed image data. The present embodiment is characterized in that the present invention is applied to a lossy decoding process and image processing is made upon decoding. Even in the case of the present embodiment, a description will be made of a disassemble example in which a 0th part is set as 4 bits and 1st through 4th parts are respectively set as 1 bit in a manner similar to the third embodiment of the image coding device described above.

The 1-bit arithmetic decoding unit 102 includes the image analyzer 23, the probability estimate unit 24 and the 1-bit image codeword analyzer 28 shown in FIG. 12. Arithmetic coding is used as a coding method. The 4-bit arithmetic decoding unit 101 has the same configuration as the 1-bit arithmetic decoding unit 102. The 1-bit image codeword analyzer 28 is functionally changed so as to be able to deal with 4-bit data and the arithmetic coding is used as the coding method. The 4-bit arithmetic decoding unit 101 and the 1-bit arithmetic decoding unit 102 perform processing in accordance with a command of the control data 108 sent from the controller 104 to thereby send the processed code to an image synthesizer 25 as disassembled image data 35 and transmit the amount or quantity of the code to the code quantity calculation unit 103 as code-quantity data 106.

The code quantity arithmetic unit 103 calculates the sum of code quantities corresponding to an image while being under processing at present, based on the code-quantity data 106 sent from the 4-bit arithmetic decoding unit 101 and the 1-bit arithmetic decoding unit 102. Thereafter, the code quantity calculation unit 103 sends the result of calculation to the controller 104 as the total code-quantity data 107. The controller 104 controls respective portions through the control data 108, based on the total code-quantity data 107. Further, the controller 104 sends an error limit or range of an decoded image to the image processor 105 as the quantization width data 109.

The image synthesizer 25 sends the decoded image data 110 to the image processor 105 in accordance with the command of the control data 108 sent from the controller 104. If all the parts are now coded so that an output command is issued before all the parts are available, it is then feasible to realize lossy coding in which the decoded image and the original image do not coincide with each other. In the present embodiment, the issuance of the output command is made by making a comparison between the code quantity and the threshold.

The image processor 105 performs image processing using the quantization width data 109 such that respective pixel values do not exceed their error limits. An image output unit 26 outputs processed image data 111 sent from the image processor 105.

Figure 20:
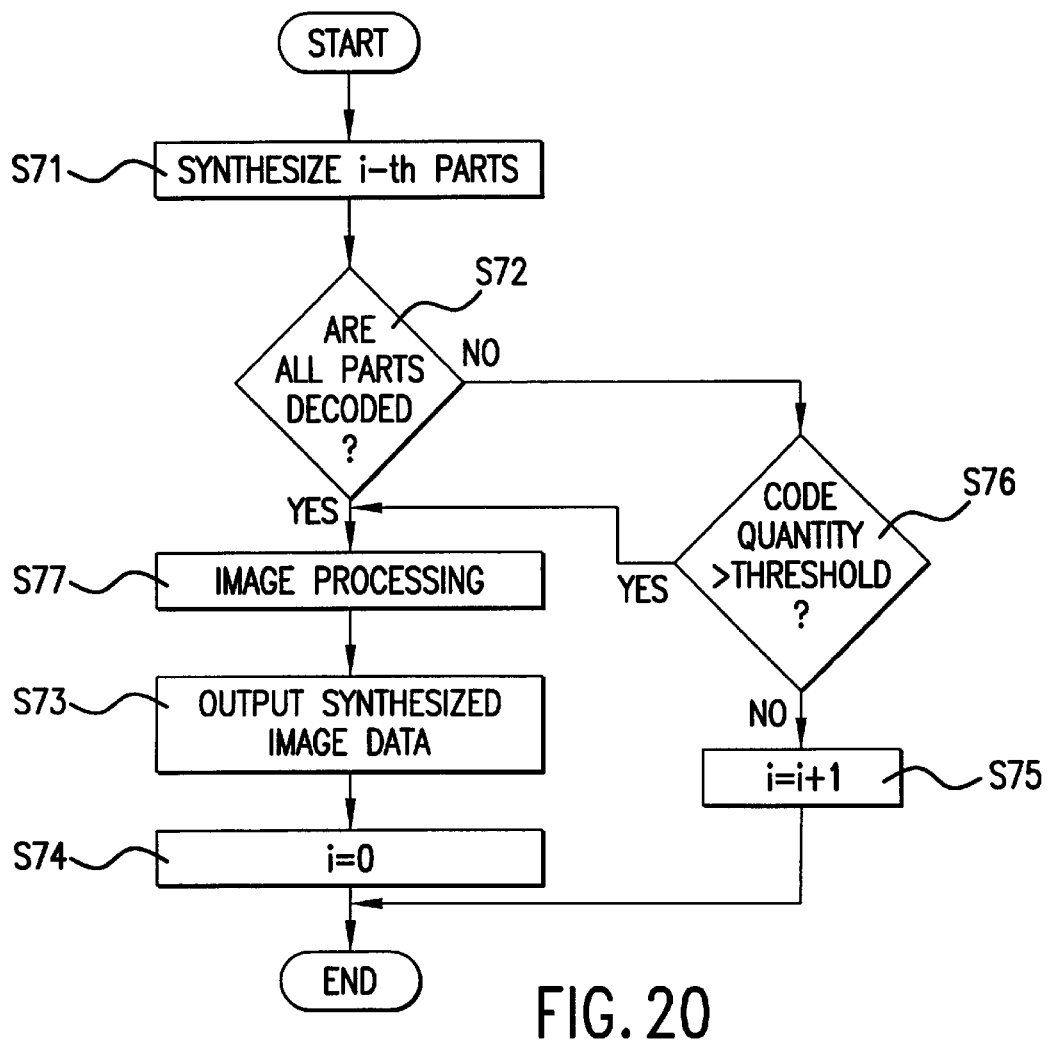
FIG. 20 is a flowchart for describing one example of the operation of an image data output process executed by the third embodiment shown in FIG. 19.

One example of the operation of the third embodiment of the image decoding device of the present invention will next be described. The entire operation of the present embodiment is substantially as shown in FIG. 6. However, the present embodiment is different in the process of S55 in FIG. 6 from the previous embodiment. The process of S55 in FIG. 6 is shown in FIG. 20. FIG. 20 is a flowchart for describing one example of the operation of an image data output process executed by the third embodiment of the image decoding device of the present invention. Process steps of S71 through S75 in the process shown in FIG. 20 are the same as the process steps shown in FIG. 10.

In S71, i-th parts are synthesized into one. It is judged in S72 whether all the parts have been decoded. If it is judged that non-processed parts remain, then the routine procedure proceeds to S76 where the controller 104 judges whether the total code-quantity data 107 sent from the code quantity calculation unit 103 exceeds a predetermined threshold. If it is judged in S76 that the total code quantity does not exceed the threshold, then the routine procedure proceeds to S75 where only 1 is added to a variable i and the decoding of an image while being under processing is continued to perform the processing on the next part. If it is judged in S76 that the total code quantity exceeds the threshold, then the processing for decoding the subsequent parts is discontinued. Next, the routine procedure proceeds to S77 where image processing is performed and the resultant image is outputted in S73. In S74, the variable i is set to 0 and a new image is processed. Even when it is judged in S72 that all the parts have been decoded, the routine procedure proceeds to S77 where the image processing is carried out. The resultant image is outputted in S73 and the variable i is set to 0 and a new image is processed in S74.

According to the third embodiments of the above-described image coding and decoding devices, the lossy coding is realized while the arithmetic coding indicative of a lossless coding method is being used. A description will be made below of it. In the case of the coding processing as shown in FIG. 18, control for holding the code quantity per image processing unit substantially constant has been realized in S66. Similarly, in the decoding processing as shown in FIG. 20, control for holding the code quantity per image processing unit substantially constant has been realized in S76. Since the coding and decoding processes might be discontinued in the course of their processes at this time, the input image (image data 11) sent from the image input unit 1 does not necessarily coincide with the output image (processed image data 111) sent from the image output unit 26. Since, at this time, the code quantity is reduced as compared with the lossless coding that the coding and decoding processes are not discontinued, the lossy coding has already been realized.

Since the image coding device and the image decoding device process the same coded data at this time, the code can be decoded without adding unnecessary information to the code if thresholds are unified. Further, since the parts whose processing is discontinued, can be confirmed even on the coding device side, it is possible to reproduce the state of degradation in decoded image on the coding device side.

When the above-described processing is now executed in pixel units, variations in code quantity occur between a pixel from which a code is unexpectedly outputted and a pixel free from its output. Since the discontinuation process is carried out according to the code quantity, it is not preferable to produce the variations in terms of image quality. To avoid such variations, for example, the code quantity may be calculated from an internal state of an arithmetic coding unit in units of decimal fractions. Namely, a variable called "augend" is updated for each input in the case of the arithmetic coding and when the value of the augend satisfies a given condition, a code is outputted. The code quantity expressed in decimal-fraction units can be defined from the value of the augend. However, now consider that an image is handled in block units to reduce a processing load. Namely, the unit for processing the above-described image is defined as 8×8 blocks, for example. Since a change in configuration incident to a change in block unit processing can be easily handled from the configurations shown in FIGS. 17 and 19, it will not be described in detail here. Thus, since the discontinuation process is performed for every block, it is possible to accommodate the variations in code quantity per pixel as viewed on the average. As a result, such lossy coding that blocks each having a large quantity of information are roughly quantized and blocks each having a small quantity of information are finely quantized on a qualitative basis, can be realized. Upon this, the code quantity may be of course evaluated in units of the decimal fractions as described above.

Further, the final code quantity over the entire image can be controlled by changing the threshold. For example, when processing is performed every blocks, a code quantity assigned for each block can be calculated by dividing the set maximum total code quantity by the total number of blocks. Therefore, the resultant code quantity can be used as the threshold.

Further, the threshold may be a function of the code quantity while being halfway through processing. For example, a function for increasing the threshold is considered when the code quantity in a process completion stage of some parts allows for a target code quantity. Thus, image data whose processing is discontinued, can be reduced and coded in a state in which the entire code quantity remains lower than the target code quantity.

One example of a process for controlling the threshold will be described specifically. The simplest threshold is given by the following equation.

$$(\text{threshold}) = \frac{(\text{target code quantity})}{(\text{number of blocks})} \quad (1)$$

Although this value may be set as the threshold, the sum of code quantities exceeds the target code quantity because processing is completed at the time that each block has exceeded the threshold. Therefore, a code quantity exceeding the target code quantity is estimated. Now consider the difference between a code quantity assigned to each block exceeding the threshold at an i-th part and the threshold. Statistics on the difference is ideally considered to be a uniform distribution from 1 bit to the mean code quantity per block in the i-th part. Accordingly, the code quantity for the block exceeding the threshold at the i-th part can be approximated by the following equation.

$$(\text{block code quantity}) = (\text{threshold}) + \frac{CL_i}{2} \quad (2)$$

where $CL_i$ indicates the mean or average code quantity per block at the i-th part. Thus, the total code quantity is given by the following equation.

$$\begin{matrix}\text{total}\\\text{code}\\\text{quantity}\end{matrix} = \left((\text{threshold}) + \frac{CL_i}{2}\right) \times (\text{number of blocks}) \quad (3)$$

Since the threshold may be set so that the total code quantity reaches the target code quantity, the threshold is eventually given by the following equation.

$$(\text{threshold}) = \frac{(\text{total code quantity})}{(\text{number of blocks})} - \frac{CL_i}{2} \quad (4)$$

Since $CL_i$ is an unknown value in the equation, it is estimated from the following equation.

$$CL_i = CL_{i-1} \times 2 - CL_{i-2} \quad (5)$$

In the same equation, $CL_i$ is linearly estimated from the code quantities $CL_{i-1}$ and $CL_{i-2}$ in the previously processed parts. A more multidimensional estimate equation may be used as the estimate equation of (5). A description has been made here of the case where all the parts are the same number of bits for simplicity of illustration. However, this can be considered in the same manner even in the case of the different number of bits.

The threshold may be calculated with the exception of blocks in which processing has been finished before the i-th part. By doing so, the accuracy of control on the code quantity can be improved. There may be cases in which blocks estimated from the calculated threshold and the estimated $CL_i$ as not exceeding the threshold upon processing on the i-th part exist. The accuracy of control on the code quantity can be further enhanced by using a loop process for recalculating the threshold except for such blocks.

Image processing executed by the image processor 105 in the image decoding device shown in FIG. 19 will now be described. One problem of the lossy coding is how to prevent the decoded image from being degraded. To resolve the problem, a known technique is disclosed which effects image processing on the decoded image. This technique has been described in, for example, the document at the seventh Symposium (PCSJ92) on Image Coding in 1992, entitled "A noise reduction method of transform coding" by Fukuda, 2-14, pp. 97–98, 1992. However, there may be cases in which if the degree of degradation of a pixel value due to the lossy coding is not found, edges are missed because the image processing generally employed in the lossy coding is so sharp, whereas noise remains because the image processing is so unsharp.

Since a transformed value is quantized in the case of, for example, transform coding like a Baseline system of JPEG (Joint Photographic Experts Group) which is the standard for image lossy coding, it is hard to determine to which extent each of the values of pixels in a decoded image has been quantized. As a method of resolving this inconvenience, for example, a technique is known which images after processing are recoded and the codes are checked against each other, as described in the aforementioned reference. However, since it is necessary to repeat coding and decoding in this case, a processing load increases.

On the other hand, in the third embodiment, since the decoding side determines which part would be discontinued, knowledge for determining to which degree the respective pixel values include errors, can be effectively used in image processing.

Figure 21:
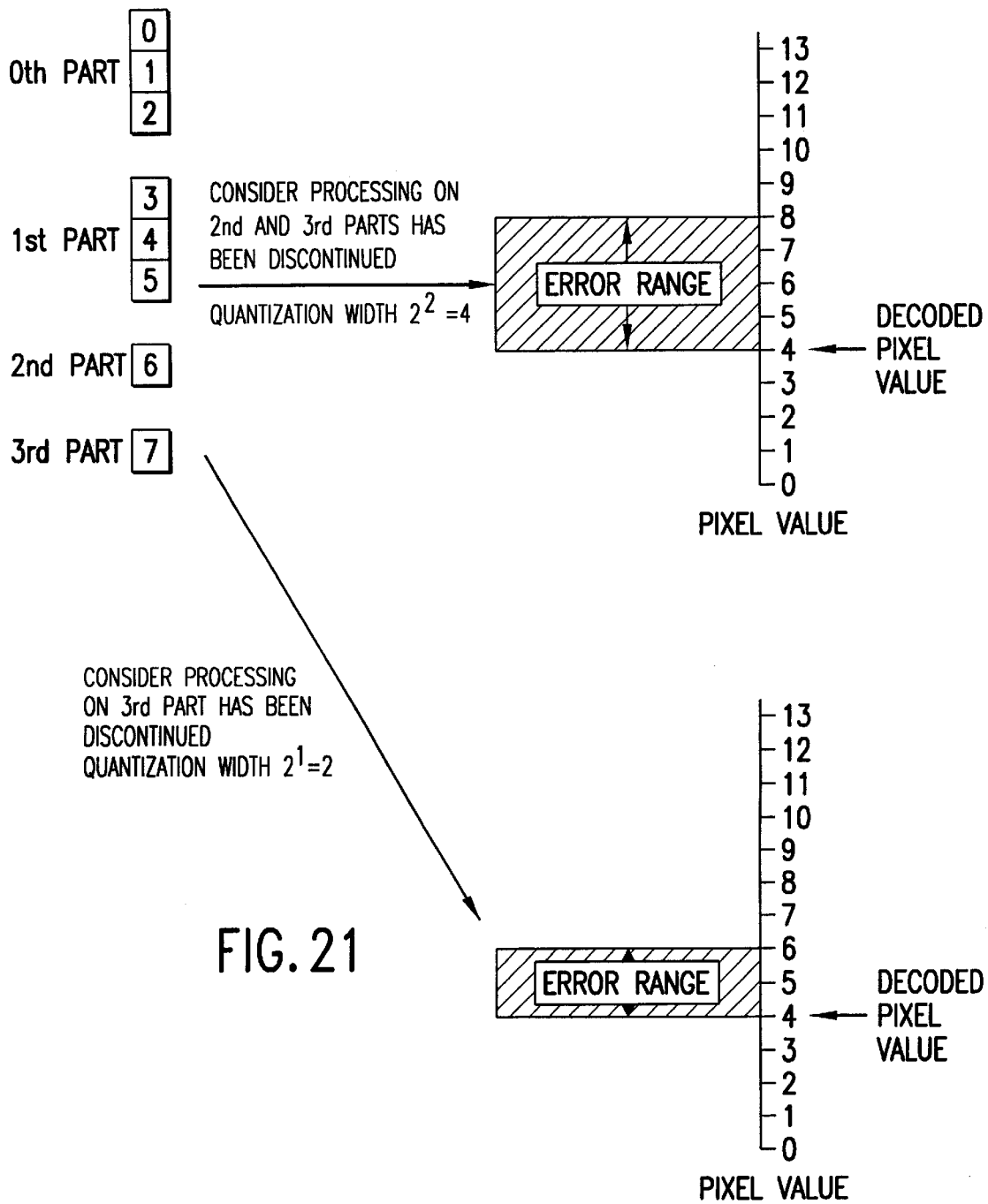
FIG. 21 is a view for describing errors included when processing is discontinued.

FIG. 21 is a view for describing errors included when the processing is discontinued. The disassembly shown in FIG. 8D is illustrated in FIG. 21 as one example. Now consider that after 0th and 1st parts have been processed, the processing is discontinued in the present example. In doing so, 2nd and 3rd parts are not processed. Since the two rightmost bits are neglected in that case, an error range or limit, i.e., a quantization width becomes 4 as shown in FIG. 21A. Namely, when the decoded pixel value is 4, the original pixel value becomes any of 4 through 7.

When allowance for the code quantity is provided and the processing is discontinued after the 0th through 2nd parts have been processed, a 1 bit in the discontinued 3rd part is simply neglected. Therefore, the quantization width becomes 2 as shown in FIG. 21B. When the decoded pixel value is 4, for example, the original pixel value becomes either one of 4 and 5.

Figures 22A, 22B, 22C, 22D:
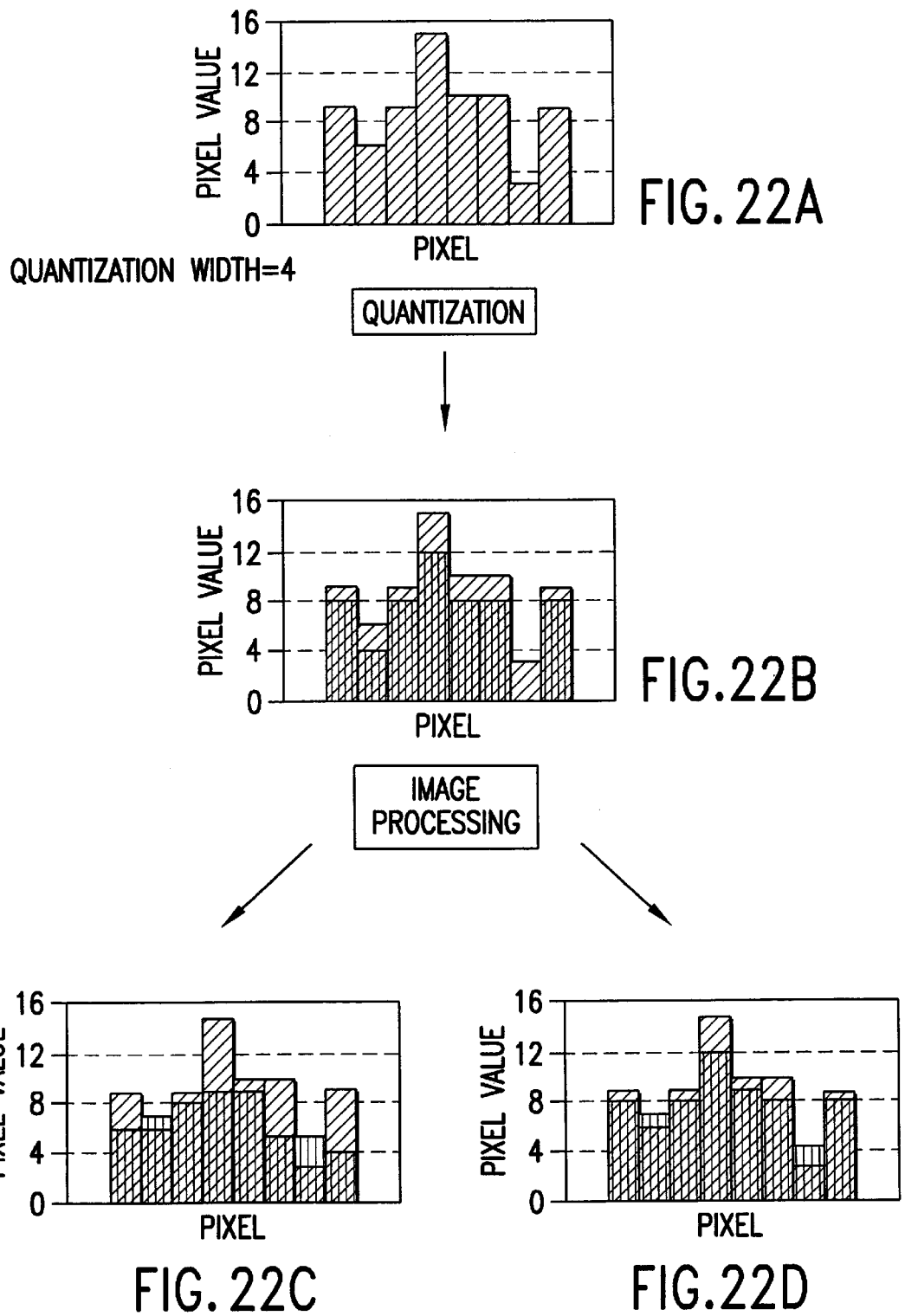
FIGS. 22A to 22D are views for describing one example of image processing in which a quantization width has been taken into consideration.

FIG. 22 is a view for describing one example of image processing in which the quantization width has been taken into consideration. The image is normally handled as a two-dimensional signal. However, a one-dimensional signal will be described for simplicity of illustration in the present example. FIG. 22A shows an input image signal. The horizontal axis indicates a pixel, and the vertical axis indicates a pixel value corresponding to the pixel. This image is quantized with the quantization width defined as 4. This corresponds to the discontinuation of the 2nd and 3rd parts at the time of the disassembly shown in FIG. 8D. The result of quantization is shown in FIG. 22B. In FIG. 22B, a graph subjected to diagonal hatching indicates a graph for the original signal, and a graph subjected to vertical hatching indicates a graph for a quantized signal.

Here, the quantized signal shown in FIG. 22B is subjected to a commonly-used average filter. The average filter has been described in, for example, "Image Analytic Handbook," p. 539, supervised by Takagi and Shimoda and issued by the Tokyo University Publishing Association in 1991. Here, f(x) is represented as the value of a pixel x and g(x) is represented as a pixel value corresponding to the result of processing. An average filter using one-dimensional signals corresponding to three points can be given by the following equation.

$$g(x_i) = \frac{f(x_{i-1}) + f(x_i) + f(x_{i+1})}{3} \quad (6)$$

However, the means of adjacent pixels is taken for data at both ends. The result obtained by subjecting the data to such an average filter is shown in FIG. 22C.

If a quantization width ΔE is taken into consideration, then the following expressions are added to the above equation.

if $f(X_i) \leq g(x_i) \leq (f(x_i) + \Delta E)$, $h(x_i) = g(x_i)$ else if $f(x_i) \leq g(x_i)$, $h(x_i) = f(x_i) + \Delta E$ else, $h(x_i) = f(x_i)$ \quad (7)

where h(x) indicates a pixel value corresponding to the result of processing on the pixel x. Namely, the expression (7) expresses the clipping of the processed pixel values in the quantization width.

The result of processing shown in FIG. 22C, which is obtained using the general average filter, becomes flat without roughness as compared with the input image. On the other hand, according to the result of processing shown in FIG. 22D, which is obtained in consideration of the quantization width, satisfactory results are obtained with respect to other portions though a pixel value at a protruded portion is reduced.

Thus, according to the third embodiment, the present invention can be applied to the lossy coding which enables the control on the code quantity. Further, the image processing, which makes use of that feature, can be effected on the decoded image.

Even in the case of the above-described third embodiment, the 4-bit arithmetic coding unit 91 and the 1-bit arithmetic coding unit 92 shown in FIG. 17 can be activated in parallel and the 4-bit arithmetic decoding unit 101 and the 1-bit arithmetic decoding unit 102 shown in FIG. 19 can be activated in parallel. In order to perform control on the discontinuance of the processing, the coded data may be outputted to the code output unit 6 or the image synthesizer 25 in accordance with the instructions issued from the controller 94 or 104. The coding unit and the decoding unit may be provided every parts. In this case, as described in the second embodiment with reference to FIG. 16, the coding units in the image coding device can be parallel-activated by, for example, inputting the data to the respective coding units while timing provided to input the data thereto being shifted. Since the control on the discontinuation of the processing is performed at this time, the code quantity, which has been processed up to that time, is determined at the time of processing on the next part in the same line. Therefore, the code quantity processed by the 0th part coding unit 81 is apparently used in the processing on the 1st part, the code quantity processed by the first coding unit 82 is used in the 2nd part, the code quantity processed by the second part coding unit 83 is used in the 3rd part, . . . on a propagation basis. Thus, a pipeline process is executed as it were.

In the above-described third embodiment, the arithmetic coding method is used as the coding method. However, a coding method other than that can be used. Described specifically, the 4-bit arithmetic coding unit 91 and the 1-bit arithmetic coding unit 92 shown in FIG. 17, and the 4-bit arithmetic decoding unit 101 and the 1-bit arithmetic decoding unit 102 shown in FIG. 19 may be respectively changed to those each using a method other than the arithmetic coding method. At this time, any ones may be used as the alternative coding method if lossless coding is made. As examples, may be mentioned, for example, Huffman coding, universal coding, run-length coding, etc. Of course, the first and second embodiments are the same. In the third embodiment, the coding method can be realized even by using binary lossless coding alone.

In the descriptions of the above-described respective embodiments, the parts are processed in turn from the 0th part. In significant bits in each block which provides less variations in pixel value, for example, the same pixel-value information is repeatedly coded, thus causing an increase in processing time. If, at this time, the common bits in the block are extracted and separately coded, then the bits are coded at a time, so that the processing can be speeded up. The remaining non-common bits may be normally coded. Decoding in this case will be described. Two types of codes composed of the common components and the remaining components are distinguished from one another, followed by delivery to the decoding side. The decoding side decodes the two codes separately and finally adds together the two decoded information to thereby obtain decoded information. If the common components are previously decoded at this time, then reference can be made to the common components when the non-common components are coded or decoded, thereby making it possible to improve a compression ratio.

According to the present invention, as has been apparent from the above description, since an image is processed by disassembling, it is possible to reduce the number of states at the time of multivalue coding, resolve problems produced incident to it, and easily realize the multivalue coding. The number of states at the time of multivalue arithmetic coding in particular can be greatly reduced and hence the multivalue arithmetic coding can be easily realized. Since a pixel value corresponding to a code quantity is ignored, the present invention can be applied to lossy coding and the code quantity can be easily controlled. Even when the present invention is applied to the lossy coding, an advantageous effect can be brought about in that a satisfactory image can be obtained by performing image processing according to a quantization width as compared with the prior art. According to the present invention, since the coding method is not necessarily limited to the multivalue arithmetic coding, the optimum multivalue lossless coding method can be used depending on the purpose.

Having now fully described the invention, it will be apparent to those skilled in the art that many changes and modifications can be made without departing from the spirit or scope of the invention as set forth herein.

What is claimed is:

1. An image coding device comprising:

image disassembling means for disassembling an input multivalued image into at least one pair of sub-images in a continuous data stream and generating disassembled images composed of the at least one pair of sub-images in the continuous data stream, at least one sub-image of the at least one pair of sub-images having a bit depth greater than one;

image referring means for referring to peripheral pixels of coded other disassembled images with respect to objective pixels of the disassembled images generated by said image disassembling means;

probability estimating means for estimating a probability estimated value corresponding to a probability that the values of the objective pixels are produced by the reference of said image referring means; and coding means for coding the disassembled images produced by said image disassembling means using the probability estimated value estimated by said probability estimating means.

2. An image coding device as claimed in claim 1, wherein said coding means is provided in plural form according to the number of the disassembled images produced by said image disassembling means.

3. An image coding device as claimed in claim 2, wherein one of said coding means codes pixels of the adjacent disassembled images, using the result of coding by said one of said coding means.

4. An image coding device comprising:

imaging disassembling means for disassembling an input multivalued image into at least one pair of sub-images in a continuous data stream and producing disassembled images composed of the at least one pair of sub-images in the continuous data stream, at least one sub-image of the at least one pair of sub-images having a bit depth greater than one;

block dividing means for dividing the disassembled images produced by said image disassembling means into blocks each having a predetermined size;

image referring means for referring to peripheral pixels of coded other disassembled images with respect to objective pixels of the disassembled images produced by said image disassembling means;

probability estimating means for estimating a probability estimated value corresponding to a probability that the values of the objective pixels are produced by the reference of said image referring means;

coding means for coding the disassembled images produced by said image disassembling means using the probability estimated value estimated by said probability estimating means;

code quantity calculating means for calculating quantities of codes coded by said coding means of each of the blocks divided by said block dividing means; and control means for discontinuing coding of the images divided by said block dividing means by said coding means when each code quantity calculated by said code quantity calculating means exceeds a predetermined threshold, said coding being subsequent to the coding of the images divided by said block dividing means.

5. An image coding device as claimed in claim 4, wherein said coding means is provided in plural form according to the number of the disassembled images produced by said image disassembling means.

6. An image coding device as claimed in claim 5, wherein one of said coding means codes pixels of the adjacent disassembled images, using the result of coding by said one of said coding means.

7. An image coding device as claimed in claim 4, further comprising code quantity estimating means for estimating a code quantity of an objective pixel from the quantities of the codes coded by said coding means, wherein said control means changes the threshold using the code quantity estimated by said code quantity estimating means.

8. An image coding device as claimed in claim 7, wherein said coding means is provided in plural form according to the number of the disassembled images produced by said image disassembling means.

9. An image coding device as claimed in claim 8, wherein one of said coding means codes pixels of the adjacent disassembled images, using the result of coding by said one of said coding means.

10. An image coding device as claimed in claim 4, further comprising same component separating means for separating disassembled images corresponding to the same components lying within the blocks divided by said block dividing means from the divided blocks, wherein said coding means separately codes the same components separated by said same component separating means.

11. An image decoding device comprising:

codeword analyzing means for decoding an input code using a probability estimated value corresponding to a probability that the value of an objective pixel is produced, to thereby obtain images disassembled into at least one pair of sub-images in a continuous data stream of a multivalued image, at least one sub-image of the at least one pair of sub-images having a bit depth greater than one;

image referring means for referring to peripheral pixels of decoded other disassembled images with respect to the disassembled images obtained by said codeword analyzing means;

probability estimating means for estimating a probability estimated value by the reference of said image referring means; and image synthesizing means for synthesizing the disassembled images obtained by said codeword analyzing means into one image.

12. An image decoding device as claimed in claim 11, wherein said codeword analyzing means is provided in plural form according to the number of the decoded disassembled images.

13. An image decoding device as claimed in claim 12, wherein one of said codeword analyzing means decodes pixels of the adjacent disassembled images, using the result of decoding by said one of said codeword analyzing means.

14. An image decoding device as claimed in claim 11, further comprising image processing means for effecting image processing for correcting the values of pixels in the image synthesized by said image synthesizing means within a quantization width by using peripheral pixels, on the pixels in the synthesized image.

15. An image decoding device comprising:

codeword analyzing means for decoding an input code using a probability estimated value corresponding to a probability that the value of an objective pixel is produced, to thereby obtain images disassembled into at least one pair of sub-images in a continuous data stream of a multivalued image, at least one sub-image of the at least one pair of sub-images having a bit depth greater than one;

image referring means for referring to peripheral pixels of decoded other disassembled images with respect to the disassembled images obtained by said codeword analyzing means;

probability estimating means for estimating a probability estimated value by the reference of said image referring means;

image synthesizing means for synthesizing the disassembled images obtained by said codeword analyzing means into one image;

code quantity calculating means for calculating a quantity of the input code for each disassembled block; and control means for discontinuing decoding of the images divided into the blocks by said codeword analyzing means when the code quantity calculated by said code quantity calculating means exceeds a predetermined threshold, said decoding being subsequent to the decoding of the images divided into the blocks.

16. An image decoding device as claimed in claim 15, further comprising code quantity estimating means for estimating a code quantity of an objective pixel from the input code, wherein said control means changes the threshold using the code quantity estimated by said code quantity estimating means.

17. An image decoding device as claimed in claim 15, wherein said codeword analyzing means is provided in plural form according to the number of the decoded disassembled images.

18. An image decoding device as claimed in claim 17, wherein one of said codeword analyzing means decodes pixels of the adjacent disassembled images, using the result of decoding by said one of said codeword analyzing means.

19. An image decoding device as claimed in claim 15, wherein the input code is composed of a codeword having the same component for each block, which is indicative of each disassembled image, and other codewords, and said codeword analyzing means decodes the same component for each block from the input code independent of other components, and further comprising image merging means for merging the disassembled image corresponding to the same component which has been decoded by said codeword analyzing means and disassembled images corresponding to other components into one.

20. An image decoding device as claimed in claim 19, further comprising image processing means for effecting image processing for correcting the values of pixels in the image synthesized by said image synthesizing means within a quantization width by using peripheral pixels, on the pixels in the synthesized image.

* * * * *